(12) United States Patent
Kang

(10) Patent No.: US 11,173,431 B2
(45) Date of Patent: Nov. 16, 2021

(54) NON-POWERED DRAIN PUMP SCREEN DEVICE

(71) Applicant: 2H SANEOP Inc., Busan (KR)

(72) Inventor: Byeonggwon Kang, Busan (KR)

(73) Assignee: 2H SANEOP Inc., Busan (KR)

( * ) Notice: Subject to any disclaimer, the term of this patent is extended or adjusted under 35 U.S.C. 154(b) by 194 days.

(21) Appl. No.: 16/671,439

(22) Filed: Nov. 1, 2019

(65) Prior Publication Data

US 2020/0139272 A1    May 7, 2020

(30) Foreign Application Priority Data

Nov. 5, 2018  (KR) .................. 10-2018-0134524
Oct. 8, 2019  (KR) .................. 10-2019-0124625
Oct. 8, 2019  (KR) .................. 10-2019-0124629

(51) Int. Cl.
*B01D 29/64* (2006.01)
*E03F 5/14* (2006.01)
*B01D 33/80* (2006.01)
*B01D 33/52* (2006.01)
*B01D 29/72* (2006.01)
*B01D 29/03* (2006.01)
(Continued)

(52) U.S. Cl.
CPC ......... *B01D 29/6476* (2013.01); *B01D 29/03* (2013.01); *B01D 29/52* (2013.01);
(Continued)

(58) Field of Classification Search
CPC .... B01D 29/6476; B01D 29/72; B01D 29/03; B01D 29/52; B01D 29/60; B01D 29/965; B01D 29/94; B01D 33/802; B01D 33/52; E03F 5/14; C02F 1/004; C02F 2303/16; C02F 2103/001; C02F 2103/24
See application file for complete search history.

(56) References Cited

U.S. PATENT DOCUMENTS 1,594,854 A  *  8/1926  Savage .................. B07B 1/286
                                                         209/346
3,843,062 A  *  10/1974  Neidl .................... B01D 29/54
                                                         241/46.11
(Continued)

FOREIGN PATENT DOCUMENTS

JP         11-181747    *  7/1999
JP         2005146590   *  9/2005
(Continued)

OTHER PUBLICATIONS

KR-1020060074293 (machine translation and original attache (Year: 2006).*

(Continued)

*Primary Examiner* — Liam Royce
(74) *Attorney, Agent, or Firm* — NSIP Law

(57) ABSTRACT

A non-powered drain pump screen device is disposed in a river, a stream, a waterway, or a place in which a significant amount soil is carried by a water flow. Upper and lower impellers are provided with upper and lower blades. The lower blades prevent reentry of impurities while rotating due to resistance to a flow of fluid in a non-powered manner. The upper impellers are rotated in a non-powered manner, so that the upper blades filter impurities. The non-powered drain pump screen device is disposed in a waterway to remove impurities at low maintenance costs.

20 Claims, 16 Drawing Sheets

(51) Int. Cl.
  *B01D 29/52* (2006.01)
  *B01D 29/96* (2006.01)
  *B01D 29/60* (2006.01)
  *C02F 1/00* (2006.01)
  *B01D 29/94* (2006.01)
  *C02F 103/00* (2006.01)

(52) U.S. Cl.
  CPC ............ *B01D 29/60* (2013.01); *B01D 29/72* (2013.01); *B01D 29/94* (2013.01); *B01D 29/965* (2013.01); *B01D 33/52* (2013.01); *B01D 33/802* (2013.01); *C02F 1/004* (2013.01); *E03F 5/14* (2013.01); *C02F 2103/001* (2013.01); *C02F 2303/16* (2013.01)

(56) References Cited

U.S. PATENT DOCUMENTS

| | | | | |
|---|---|---|---|---|
| 4,289,619 A | * | 9/1981 | Sampson | B01D 29/03 210/159 |
| 5,435,854 A | * | 7/1995 | Derlein | B08B 9/035 134/111 |
| 2014/0042078 A1 | * | 2/2014 | Hwang | B01D 33/048 210/413 |
| 2015/0027964 A1 | * | 1/2015 | Davis | B01D 33/41 210/804 |

FOREIGN PATENT DOCUMENTS

| | | | |
|---|---|---|---|
| KR | 1020060074293 | * | 7/2006 |
| KR | 100835165 B1 | * | 6/2008 |
| KR | 101055171 B1 | * | 8/2011 |
| KR | 101702836 B1 | * | 2/2017 |

OTHER PUBLICATIONS

KR-101702836 (machine translation and original attached) (Year: 2017).*

* cited by examiner

NON-POWERED DRAIN PUMP SCREEN DEVICE

CROSS REFERENCE TO RELATED APPLICATION

The present application claims priority to Korean Patent Application No. 10-2018-0134524 filed in the Republic of Korea on Nov. 5, 2018, Korean Patent Application No. 10-2019-0124625, filed in the Republic of Korea on Oct. 8, 2019, Korean Patent Application No. 10-2019-0124629, filed in the Republic of Korea on Oct. 8, 2019, which are hereby incorporated by reference for all purposes as if fully set forth herein.

BACKGROUND

Field

The present disclosure relates to a drain pump screen device and, more particularly, to a system for removing impurities from fluid entering a drain pump using a non-powered screen device.

Description

In general, an impurity removing device for a drain pump is disposed in a specific location in a river or a stream into which sewage and supply water flows, an overflowing waterway, or the like. Soil, impurities, or various types of living waste carried by a water flow may reach the drain pump, unless removed at the right place and the right time. In such a situation, the flow may be obstructed and may overflow the waterway, thereby damaging areas around the drain pump. In a worse situation, water may not be able to flow, thereby forming a pool, from which odor may be created. In this case, a variety of impurities too numerous to list, such as soil, plant, vinyl, plastic, and industrial waste, may be mixed with the water flow. Accordingly, a simple screen device for removing impurities may not be able to remove impurities. In addition, when an apparatus for filtering impurities using power is additionally operated, a large amount of costs may be consumed to drive and maintain a motor or a pump.

FIG. 1 is conceptual view illustrating a schematic configuration of a multi-stage rotary impurity collector.

The multi-stage rotary impurity collector is an apparatus comprised of a plurality of rotary screens, configured to remove impurities using power supplied by a motor. To date, multi-stage rotary impurity collectors having such a structure have most typically been used, as is disclosed in Korean Patent Application No. 10-2008-0074295.

Specifically, multi-stage rotary screens are obliquely arranged to move impurities upwardly by multiple steps.

Such multi-stage rotary screens are fitted together at predetermined distances from each other. A rotary shaft is disposed in the central portion of each of the rotary screens, and a filtering frame is coupled to the rotary shaft. The rotary screens can only be rotated by the rotation of the rotary shafts.

The plurality of multi-stage rotary screens must be obliquely disposed across a waterway. The plurality of multi-stage rotary screens have sprockets fixed to front ends thereof, and are connected to each other using a chain. A guide or a container for preventing the chain connected to the plurality of sprockets from being dislodged must be additionally provided.

In addition, the rotary screens are operated by the rotation of external motors. Two external motors are disposed on both ends of the rotary shaft. Here, the motors are required to have the same revolutions per minute (RPM). If the difference in the RPM between the two motors exceeds a range of control set by a user, the sprockets and the chain may be significantly damaged. Such damage may increase the maintenance costs of the apparatus.

Accordingly, in order to solve the above-described problems, there is increasing demand for the development of a non-powered drain pump screen device able to operate when the supply of power is difficult and to remove impurities using a flow of fluid, rather than the typical impurity collector using power.

The information disclosed in the Background section is only provided for a better understanding of the background and should not be taken as an acknowledgment or any form of suggestion that this information forms prior art that would already be known to a person having ordinary skill in the art.

BRIEF SUMMARY

Various aspects of the present disclosure provide a non-powered drain pump screen device able to rotate an upper impeller and a lower impeller without power to reduce power consumption and simplify construction and movement, thereby improving the convenience of a user.

Also provided is a non-powered drain pump screen device able to easily remove impurities using sliding movement of a main stopper.

Also provided is a non-powered drain pump screen device able to improve durability such that no load is applied to elastic pivot movement of the main stopper.

Also provided is a non-powered drain pump screen device further including a working device or a sub-impeller to efficiently remove impurities accumulated on the main stopper.

According to an aspect, a non-powered drain pump screen device may include: a drain pump; a housing disposed on a front end of the drain pump, and having an inner space, wherein the housing includes an inlet portion defined by an open front portion of the housing, a rear portion located opposite the inlet portion and having an outlet portion connected to the drain pump, left and right side portions, an upper open area adjacent to the inlet portion, a top plate closing an upper portion of the housing, except for the upper open area; a lower impeller disposed within the space, wherein the lower impeller includes a lower shaft rotatably coupled to the side portions while extending through lower portions of the side portions, a plurality of coupling holes provided in the lower shaft, and lower blades extending a predetermined length to be movably coupled to the coupling holes; an upper impeller extending across both peripheral portions of the top plate and disposed on the top plate, wherein the upper impeller includes an upper shaft having the same configuration as the lower shaft of the lower impeller, a plurality of coupling holes provided in the upper shaft, and upper blades extending a predetermined length to be movably coupled to the coupling holes; a chain connecting the lower impeller and the upper impeller; an main stopper having a shape of an inclined plate extending from a bottom of the housing to the rear portion of the housing along an inclined line, with a plurality holes being provided in the main stopper, wherein portions of the lower blades dropping due to gravity collide with the main stopper, thereby being prevented from being dislodged from the lower shaft; and an inclined sub-stopper extending from one peripheral portion of the top plate, wherein portions of the upper blades dropping due to gravity collide with the sub-stopper so as not to be dislodged from the upper shaft.

In addition, the main stopper may include: a lower erect portion erect from the bottom of the housing to a predetermined height; a seating portion horizontally extending from one end of the lower erect portion to the rear portion of the housing to be located below the lower impeller; an inclined portion extending upwardly from the seating portion to the rear portion of the housing; and an upper erect portion bent upwardly from the inclined portion and coupled to the rear portion of the housing.

The non-powered drain pump screen device according to the present disclosure as described above has the following features.

1) It is possible to efficiently remove impurities due to non-powered rotation of the upper impeller and the lower impeller, and the non-powered drain pump screen device can be easily constructed and moved.

2) The main stopper can slide along the rails disposed on the rear portion to improve the efficiency of the removal of impurities.

3) It is possible to efficiently remove impurities accumulated on the main stopper using the working device or the sub-impeller.

DESCRIPTION OF DRAWINGS

The above and other objects, features, and advantages of the present disclosure will be more clearly understood from the following detailed description, taken in conjunction with the accompanying drawings, in which.

DETAILED DESCRIPTION

Figure 1:
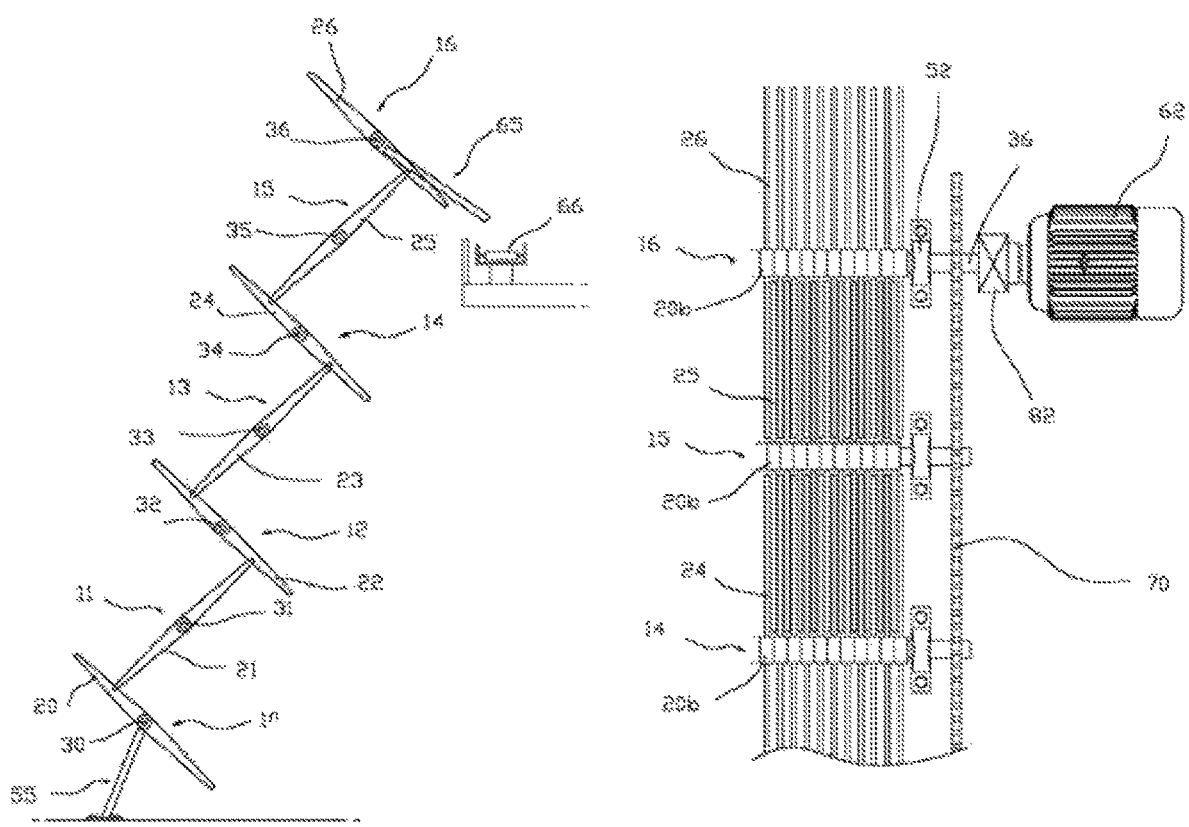
FIG. 1 is a reference view illustrating an impurity remover of the related art.

Hereinafter, exemplary embodiments of the present disclosure will be described in detail with reference to the accompanying drawings. It should be understood that the accompanying drawings may not be drawn to scale, and the same elements may be designated by the same reference numerals, even though they may be used in different drawings.

Figure 2:
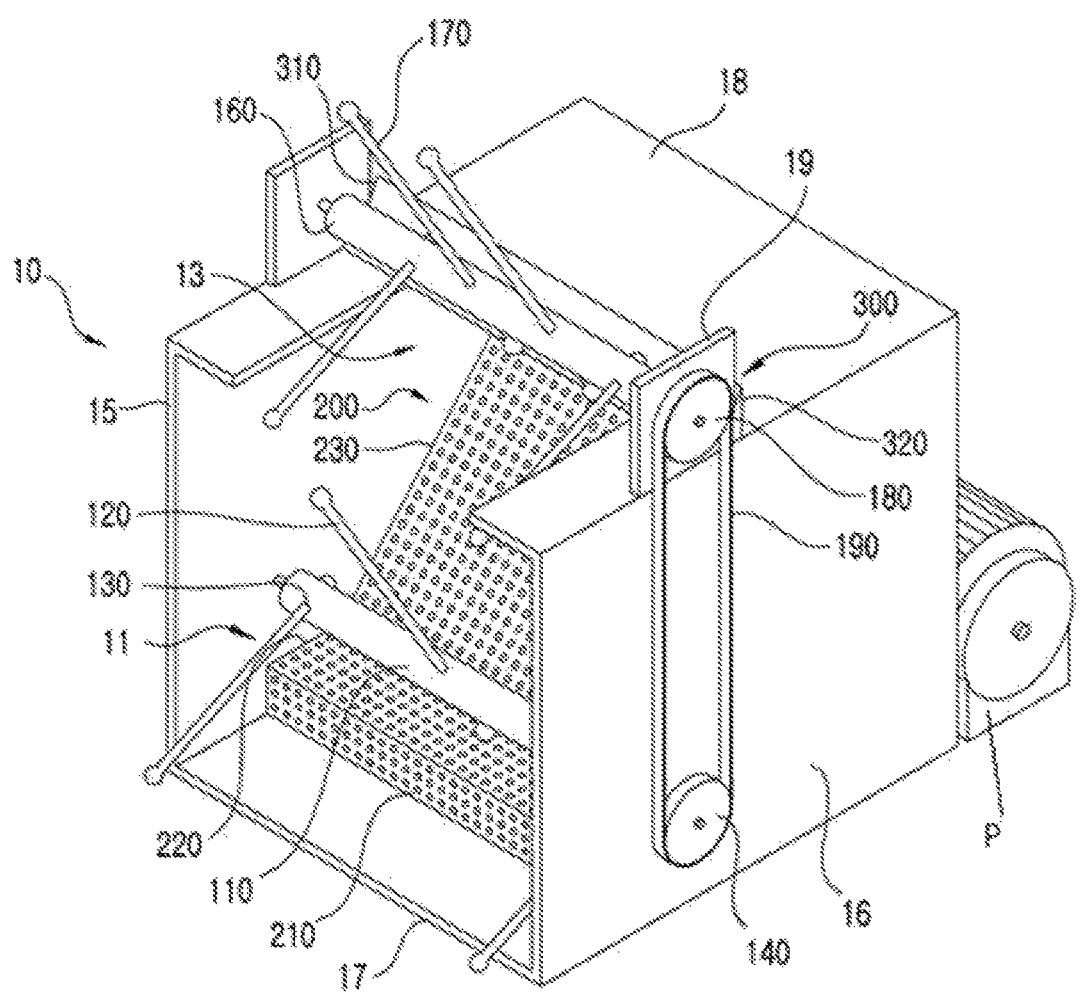
FIG. 2 is a perspective view illustrating a schematic structure of a screen device according to an embodiment.

FIG. 2 is a perspective view illustrating a schematic structure of a screen device according to an embodiment.

Referring to FIG. 2, it can be appreciated that outer components of the screen device according to the disclosure are generally comprised of a housing 10 and a drain pump P disposed at the rear of the housing 10.

The housing 10 has a hexahedral shape, and includes an inlet portion 11 defined by an open front portion to intake fluid, a rear portion 12 (see FIG. 4) located opposite the inlet portion 11, and an outlet portion 1 (see FIG. 4) to discharge fluid. In addition, the housing 10 may include: an upper open area 13 defined in an upper front portion of the housing 10 to serve as a space necessary for the normal operation of an upper impeller, to be described later; a top plate 18 closing an upper portion of the housing 10, except for the upper open area 13; and two side portions 14, i.e. a left side portion 15 and a right side portion 16, closing side portions to the left and right of the inlet portion 11 and the rear portion 12. The housing 10 may further include a bottom 17.

In addition, although not shown in the drawings, a container having an open upper portion to prevent the reentry of impurities may be disposed outside of the housing 10, more particularly, on the outer surface of one of the two side portions 14.

The inlet portion 11 remains open such that fluid can be taken in constantly.

The rear portion 12 may be disposed in a position corresponding to the inlet portion 11, and may be provided with the outlet portion 1.

The outlet portion 1 is provided in the rear portion 12 corresponding to the inlet portion 11, allowing fluid to be easily discharged. Here, a connector, such as a pipe having a flange, connecting the outlet portion 1 and the drain pump P, may be provided outside of the housing 10.

The upper open area 13 extends from the inlet portion 11 to the upper front portion of the housing 10 so as not to obstruct the rotation of blades of an upper impeller 150, to be described later. The upper impeller 150 is located in the upper open area 13.

The top plate 18 is a portion closing the upper portion of the housing 10, except for the upper open area 13. The top plate 18 serves to prevent water or impurities from exiting the housing 10 without passing through the upper impeller 150 in the upper open area 13.

The side portions 14 are comprised of the left portion 15 and the right portion 16 of the housing 10. Connection holes may be formed in lower portions of the left portion 15 and the right portion 16, such that a lower impeller 100, to be described later, can be connected to the left portion 15 and the right portion 16 through the connection holes.

The bottom 17 is provided on the bottom of the housing 10 to prevent fluid from flowing to the outlet portion 1 without passing through the impeller. The bottom 17 may be alternatively provided, depending on the place in which the screen device according to the disclosure is disposed.

The shape of the housing 10 illustrated in FIG. 2 is only an example and is not limited to the hexahedral shape. The shape of the housing 10 may be any shape, such as a hexahedral shape, a cylindrical shape, or a trapezoidal shape, as long as intake and discharge of fluid is not obstructed.

Figure 3:
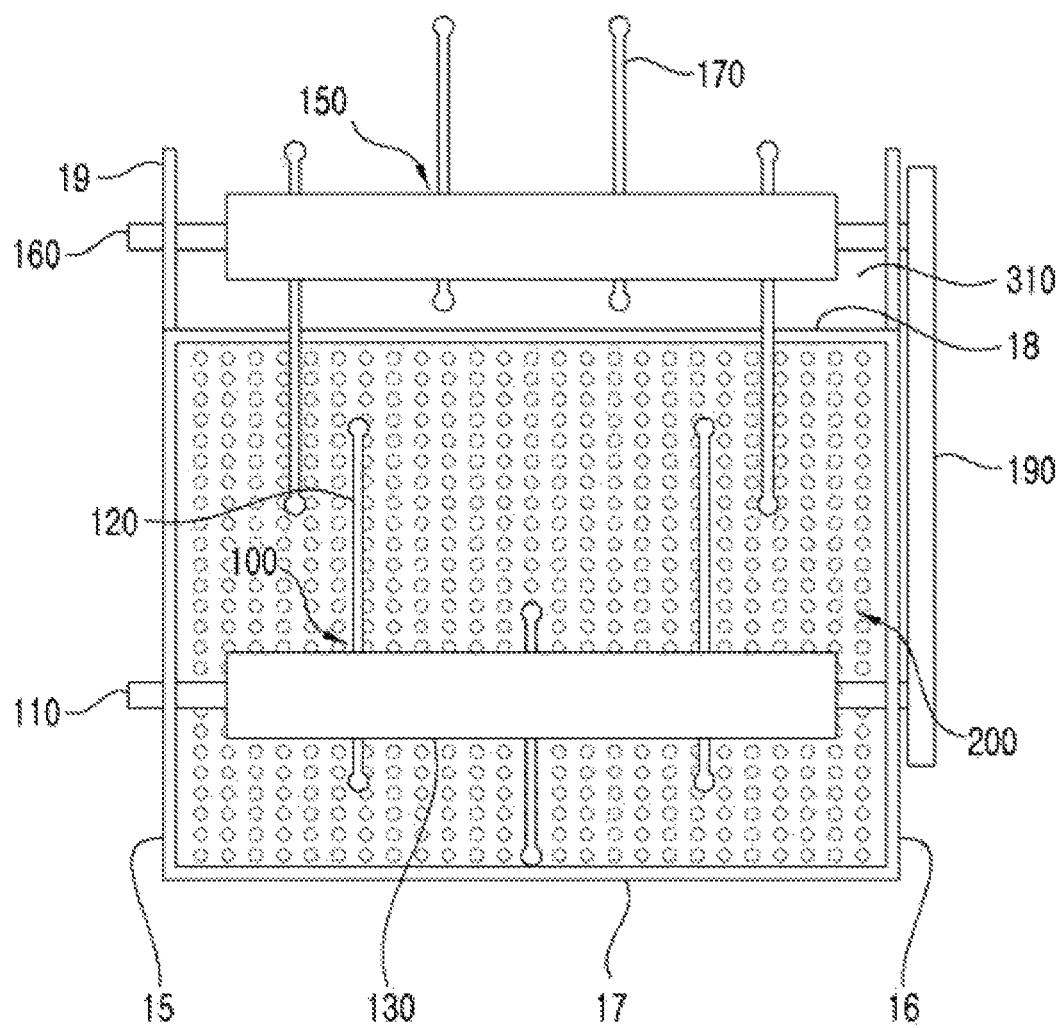
FIG. 3 is a front view illustrating the schematic structure of the screen device according to the embodiment.

FIG. 3 is a front view illustrating the schematic structure of the screen device according to the embodiment.

Referring to FIG. 3, it can be appreciated that the screen device according to the disclosure includes the lower impeller 100 and the upper impeller 150.

The lower impeller 100 is a structure disposed inside of the housing 10 to be spaced apart from the bottom 17 of the housing 10. The lower impeller 100 is rotatably coupled to the lower portions of the side portions 14 while extending through the side portions 14.

Specifically, the lower impeller 100 includes a lower shaft 110, lower blades 120, and a lower sprocket 140.

The lower shaft 110 extends through the right and left portions of the housing 10, and is rotatably coupled to the connection holes in the side portions 14. In addition, holes 130 are formed at predetermined distances, such that the lower blades 120 can be disposed perpendicularly to the axis of the lower shaft 110 and the lower sprocket 140 can be disposed in any location (i.e. a location inside of or outside of the housing 10).

The lower blades 120 are provided as a plurality of lower blades 120. Each of the lower blades 120 is a structure extending through the corresponding holes 130, in opposite directions perpendicularly to the lower shaft 110, and protruding predetermined distances from the lower shaft 110. Here, the diameters of the holes 130 may be greater than the diameters of the lower blades 120, with gaps being defined between the lower blades 120 and the holes 130, such that the lower blades 120 can slide in the direction of gravity. In addition, the lower blades 120 may be fabricated in a variety of shapes, such as a pipe, a circular rod, or a bar, without being limited to a specific shape, as long as a suitable amount of resistance to fluid entering the inlet portion 11 can be obtained.

The lower sprocket 140 is a means for working in concert with an upper sprocket 180 to drive a chain 190, to be described later. As illustrated in FIG. 2, the lower sprocket 140 may be disposed on a distal end of the lower shaft 110. The lower sprocket 140 may be disposed on a portion of the lower shaft 110 within the housing 10, as required.

The upper impeller 150 has a configuration similar to the above-described specific configuration of the lower impeller 100, and is connected to the housing 10 using connectors protruding outward from the top plate 18 located above the lower impeller 100 to be disposed in a location covering the upper open area 13 and a portion of the inside of the housing 10.

An upper shaft 160 is rotatably connected to the top plate 18 via the connectors protruding from the top plate 18, and has a structure similar to the structure of the lower shaft 110.

Here, the holes 130 in the upper shaft 160 may alternate with the holes 130 in the lower shaft 110 such that the lower blades 120 fitted into the holes 130 in the lower shaft 110 do not collide with upper blades 170 fitted into the holes 130 in the upper shaft 160.

The upper sprocket 180 is disposed on the upper shaft 160, in a location corresponding to the lower sprocket 140 in a top-bottom direction (or vertical direction), and is connected to the lower sprocket 140 via the chain 190.

The chain 190 allows the lower sprocket 140 and the upper sprocket 180 to work in concert with each other, thereby transporting power from the lower impeller 100 to the upper impeller 150. In addition, the chain 190 causes the lower sprocket 140 and the upper sprocket 180 to simultaneously rotate in the same direction.

In FIG. 2, the chain 190 is illustrated as being disposed outside of the housing 10. The chain 190 is not limited thereto, and may be disposed inside of the housing 10. That is, the chain 190 may be disposed in a variety of locations, e.g. inside or outside of the housing 10, depending on the position of the upper and lower sprockets 140 and 180.

Figure 4:
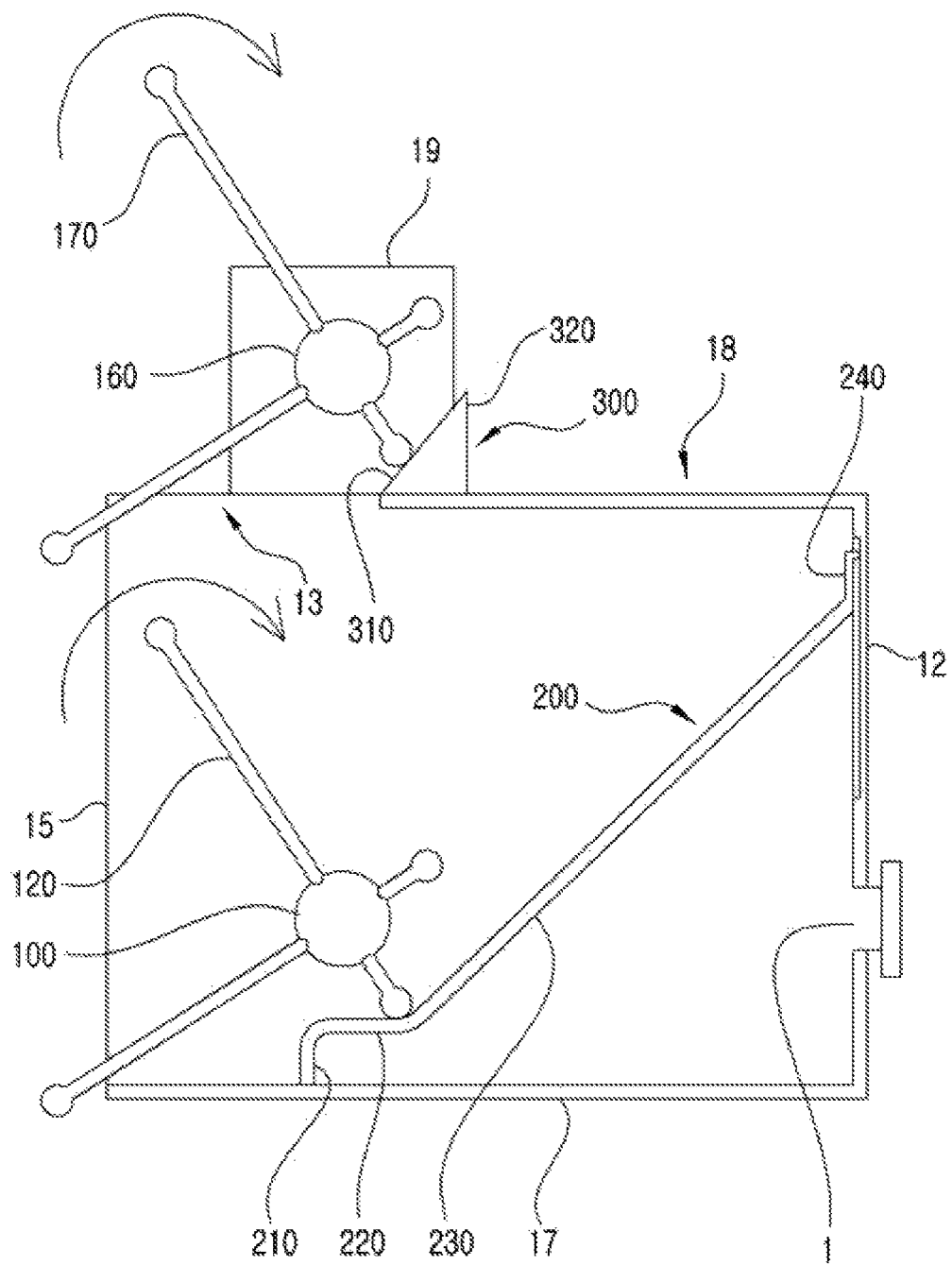
FIG. 4 is a side view illustrating the schematic structure of the screen device according to the embodiment.

FIG. 4 is a side view illustrating the schematic structure of the screen device according to the embodiment.

Referring to FIG. 4, it can be appreciated that the screen device according to the disclosure includes two stoppers to control the position of the upper and lower blades 170 and 120 of the upper and lower impellers 150 and 100.

Specifically, the stoppers according to the disclosure are comprised of a main stopper 200 and a sub-stopper 300 as two components for physically limiting the range of rotation of the upper and lower blades of the upper impeller 150 and the lower impeller 100. Here, the main stopper 200 corresponds to the lower impeller 100, while the sub-stopper 300 corresponds to the upper impeller 150.

The main stopper 200 is disposed inside of the housing 10 to extend from the left portion 15 to the right portion 16. The main stopper 200 serves to prevent impurities, not filtered by the upper impeller 150 or the lower impeller 100, from entering the drain pump. The main stopper 200 may be implemented as a grill or a mesh having a variety of shapes or patterns in which a plurality of holes are formed. This configuration prevents small residual impurities from entering the drain pump without obstructing water from entering the drain pump.

In addition, the main stopper 200 serves to prevent the lower blades 120 of the lower impeller 100, dropped due to gravity during rotation of the lower shaft of the lower impeller 100, from dropping. The main stopper 200 serves to slide the lower blades 120 of the lower impeller 100 in the direction of the top plate 18 of the housing 10, so that the rotation of the lower blades 120 due to a fluid flow can be facilitated and maximized and reverse rotation of the lower impeller 100 can be controlled.

The main stopper 200 having the above-described holes may be configured to be inclined below the lower impeller 100. Specifically, the main stopper 200 may include a lower erect portion 210 adjoining the bottom 17, a seating portion 220 on which the lower blades 120 of the lower impeller 100 are seated, an inclined portion 230, and an upper erect portion 240 connected to the outlet portion 1.

The lower erect portion 210 is erect from the bottom 17 to a predetermined height, such that the lower blades 120 of the lower impeller 100 can slide upwardly through contact with the seating portion 220. The lower erect portion 210 assists in increasing the supporting force of the screen device according to the disclosure while preventing reverse rotation of the lower impeller 100. Although the lower erect portion 210 is illustrated as being vertically erect in the drawings, the lower erect portion 210 may be erect on an incline as long as the screen device according to the disclosure does not have a structural problem.

The seating portion 220 is bent from the upper end of the lower erect portion 210 at a substantially horizontal angle to extend in the direction of the rear portion 12. The seating portion 220 is located below the lower impeller 100.

As will be described in more detail later, the lower blades 120 dropping toward the seating portion 220 collide with the seating portion 220 and then slide upwardly due to the rebound thereof from the seating portion 220 and the rotation of the lower shaft 110. In this manner, the lower blades 120 may maximize resistance to a fluid flow and prevent the problem in that the lower blades are dislodged from the lower impeller 100.

The inclined portion 230 is bent upwardly from the seating portion 220 at a predetermined angle to extend in the direction of the rear portion 12.

The upper erect portion 240 is coupled to the upper portion of the rear portion 12. The upper erect portion 240 is bent upwardly from the upper end of the inclined portion 230 to provide a physical area to be coupled to the rear portion 12. This configuration prevents the main stopper 200 from being unnecessarily moved by incoming water and provides a base area by which the main stopper 200 can be mounted on the housing 10 in position.

Furthermore, the sub-stopper 300 includes a sub-inclined portion 310 and a sub-erect portion 320.

The sub-inclined portion 310 is an inclined portion extending upward from a portion of the top plate 18, positioned below the upper shaft 160, toward the rear portion 12.

The sub-erect portion 320 is an erect portion extending vertically from the upper end of the sub-inclined portion 310 in a normal direction, i.e. in a direction perpendicular to the top plate 18, to adjoin the outer surface of the top plate 18. The sub-erect portion 320 may not be necessarily erect and may be fabricated in a variety of shapes as long as the sub-inclined portion 310 can be supported (i.e. a physical volume of the sub-stopper can be maintained).

The operation of the screen device according to the disclosure, having the configuration illustrated in FIGS. 2 to 4, will be described as follows.

When the drain pump operates in a location in which the screen device according to the disclosure is disposed, fluid (e.g. rainwater) in the surrounding areas enters the internal space of the housing through the inlet portion 11.

Here, incoming fluid rotates the lower blades 120 of the lower impeller 100 in the flowing direction of fluid while filling the lower portion of the inside of the housing 10 or flowing through the inside of the housing 10.

When the lower blades 120 are rotated by incoming fluid, the lower blades 120 slide and drop downwardly through the holes 130 in the lower shaft 110 due to gravity after having passed a point at which the lower blades 120 are vertically erect in the direction of the top plate 18. The dropped lower blades 120 collide with the inclined portion 230 of the main stopper 200 and then slide upwardly due to the rebound thereof from the inclined portion 230 and continuous rotation force of the lower impeller 100. The upwardly-rebounding lower blades 120 slide upwardly through the holes 130 in the lower shaft 110. Accordingly, the lower blades 120 can easily slide without being dislodged from the lower impeller 100 while remaining in contact with fluid.

In response to the rotation of the lower impeller 100, the upper impeller 150 working in concert with the lower impeller 100 via the chain 190 rotates in the same direction. Since the upper blades 170 of the upper impeller 150 are configured to alternate with the lower blades 120, the upper blades 170 can easily receive impurities from the lower blades 120. The impurities delivered to the upper blades 170 in this manner are moved to the outside of the upper open area 13 by the rotation of the upper impeller 150.

Here, the impurities moved upwardly may be accommodated in a container (not shown) separately provided outside of the housing 10, more particularly, on an outer surface of the side portions 14, in order to prevent the impurities from reentering the inlet portion 11. Accordingly, this provides convenience to a user, such that a user is only required to remove the impurities accumulated in the container in an impurity treatment process or a maintenance process of the screen device according to the disclosure.

The impurities filtered by the screen device according to the disclosure may include various types of materials, such as vinyl, plastic, waste paper, blanket, and cloth.

In addition, fine impurities, not removed by the upper impeller 150 or the lower impeller 100, may enter the outlet portion 1. The fine impurities may be small rocks, debris, or the like, smaller than vinyl, cloth, or the like. When the fine impurities enter the outlet portion 1, a fluid flow may be obstructed. Accordingly, the holes in the main stopper 200 may efficiently prevent the fine impurities from moving to the drain pump.

In addition, the main stopper 200 provides not only a simple linearly inclined structure, but also a three-dimensional structure including the lower erect portion 210, the seating portion 220, the inclined portion 230, and the upper erect portion 240. According to this structure, the lower erect portion 210 is erect in the lower portion of the housing 10, through which fluid having a greatest flow rate flows, to create a vortex of fluid by upwardly rebounding fluid colliding with the lower erect portion 210. The fluid can be properly guided to the inclined portion 230 while passing by the seating portion 220. Then, the fluid can be filtered by the surface of the inclined portion 230 provided at a predetermined height from the bottom 17.

Accordingly, the main stopper 200 can efficiently resist the pressure of incoming fluid, instead of being easily crushed. In addition, as described above, the lower blades 120 can be properly prevented from being dislodged.

In addition, like the technical idea of the seating portion 220 of the main stopper 200, the sub-inclined portion 310 of the sub-stopper 300 serves to prevent the upper blades 170 from being unnecessarily dislodged from the upper impeller 150 due to gravity.

According to the screen device according to the disclosure as described above, the screen device can be disposed in a variety of places and environments, such as a water supply line, a sewage line, a waterway, a road on which rainwater overflows in the rainy season or due to a heavy rain, and an area around a river or a stream, to filter impurities in a simple manner and facilitate the drainage of water.

<<

Figure 5:
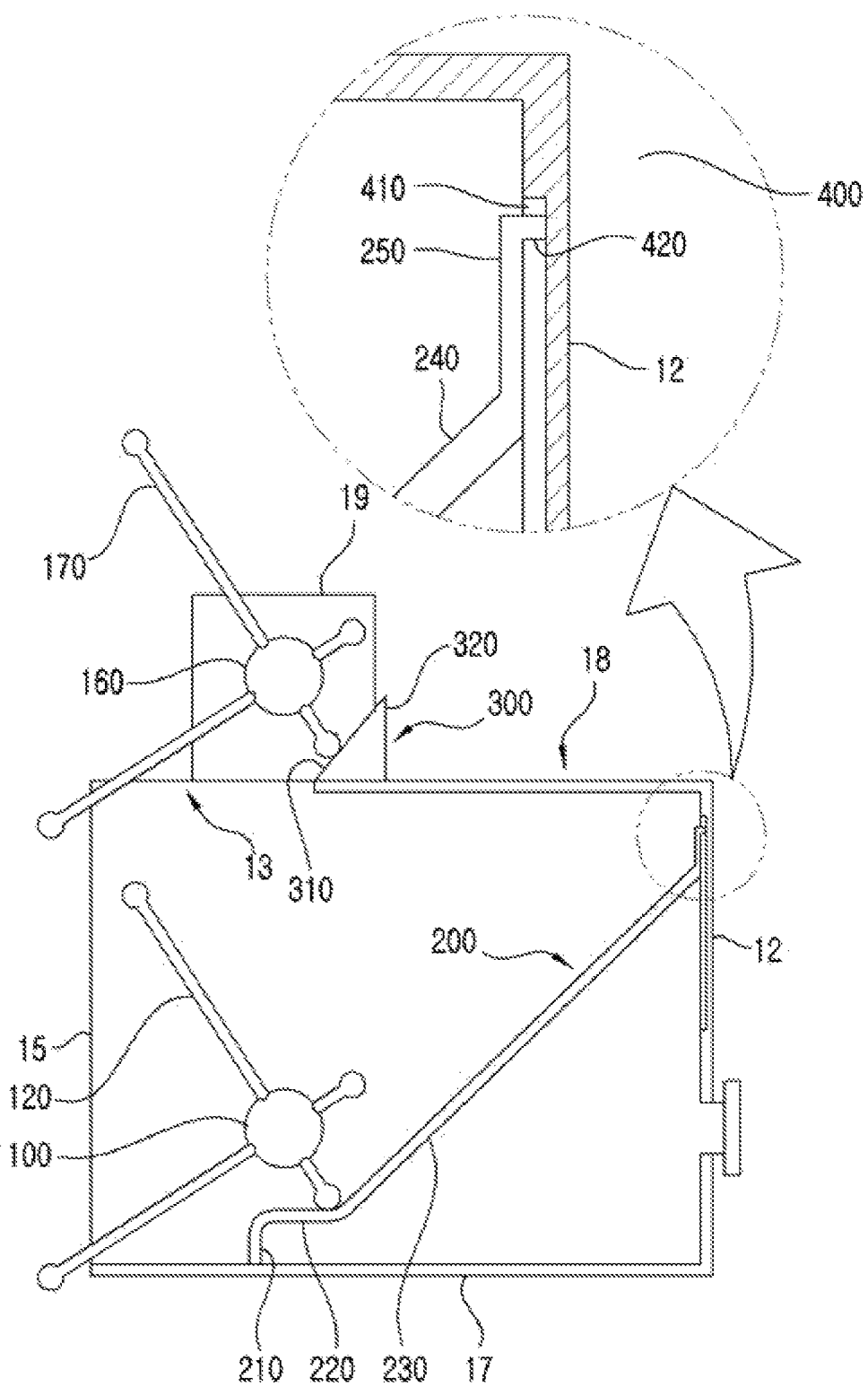
FIG. 5 is a side cross-sectional view illustrating the screen device according to another embodiment, in which the main stopper can be elastically pivoted along rails, in addition to a partially enlarged cross-sectional view of key portions.

FIG. 5 is a side cross-sectional view illustrating the screen device according to another embodiment, in which the main stopper can be elastically pivoted along rails, in addition to a partially enlarged cross-sectional view of key portions.

Rails 400 extend on both peripheral portions of the rear portion 12, adjacent to the upper erect portion 240, in a top-bottom direction. A pair of rails 400 may be provided on both upper peripheral portions of the rear portion 12 so as to adjoin or be spaced apart from the inner surface of the top plate 18. In addition, the rails 400 may extend a predetermined length so as not to interrupt the outlet portion 1.

Protrusions 420 extending from the upper erect portion 240 in a corresponding manner are coupled to the rails 400. The protrusions 420 can slide along the rails 400 so that the upper erect portion 240 is not dislodged from the rails 400, thereby providing upward and downward movement to the upper portion of the main stopper 200.

According to this structure, the upper erect portion 240 slides along the rails 400 due to the pressure of incoming fluid. Accordingly, the flexible main stopper 200 formed of a metal material or the like can elastically pivot to facilitate efficient removal of impurities accumulated on the seating portion 220 of the main stopper 200 or caught in the holes.

When the main stopper 200 is elastically pivoted by the operation along the rails 400, shear stress may occur not only in the boundary between the lower erect portion 210 and the seating portion 220, but also in the boundary (i.e. edge or bend) between the seating portion 220 and the inclined portion 230, thereby causing fatigue or damage to the main stopper 200. In this regards, the main stopper 200 is provided with additional means, to be described with reference to FIG. 5.

That is, the driving mechanism for sliding the main stopper 200 along the rails 400 may further include additional means for facilitating the elastic pivoting, such that the elastic pivoting can be performed more reliably compared to the case in which only the rails 400 are provided. The additional means will be further described with reference to FIGS. 6 to 8.

Figure 6:
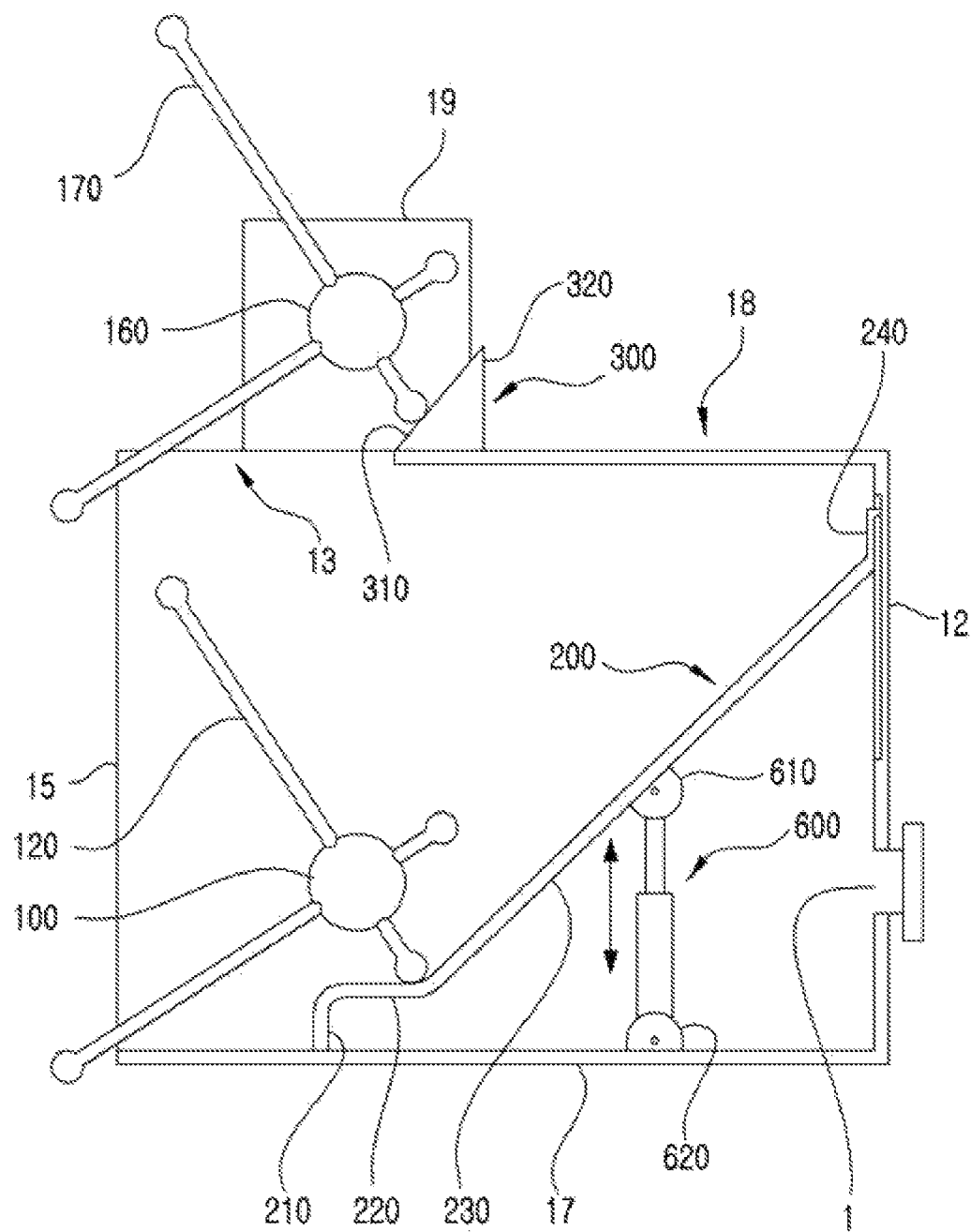
FIG. 6 is a side cross-sectional view illustrating a screen device according to another embodiment, in which the main stopper can be pivoted by means of a cylinder.

FIG. 6 is a side cross-sectional view illustrating a screen device according to another embodiment, in which the main stopper can be pivoted by means of a cylinder.

As illustrated in FIG. 6, the screen device according to the disclosure may include a cylinder 600 in which a piston reciprocates, a top joint 610 connecting an upper end of the cylinder 600 to an inner surface of the inclined portion 230, and a mount 620 connecting a lower portion of the cylinder 600 to the bottom 17.

The top joint 610 is coupled to the inclined portion 230 of the main stopper 200 and to the cylinder 600.

The mount 620 is fixed to the bottom 17 of the housing 10, and is coupled to the cylinder 600.

The cylinder 600 is coupled to the mount 620 on the bottom 17, and the piston moving in the cylinder 600 is connected to the top joint 610. Although the cylinder 600 may be driven to reciprocate up and down in a direction perpendicular to the mount 620, the mount 620 may be implemented as a pivotable joint (i.e. a bottom joint) such that the cylinder 600 may pivot.

The cylinder 600 may be provided together with the rails 400. In response to the stretching and contraction of the cylinder 600, the main stopper 200 may be elastically pivoted in a top-bottom direction along the rails 400. When the inclined angle of the main stopper 200 is changed in this manner, a vortex may be created in incoming fluid. The vortex can change the direction of resistance applied to impurities from the fluid, thereby removing impurities from the fluid.

In addition, although not shown in FIG. 6, the driving mechanism of the cylinder 600 may further include a motor. Alternatively, a flow meter, a hydraulic gauge, or the like may be disposed in the outlet portion 1 of the housing 10 so as to work in concert with a servomotor. When a flow rate is not properly discharged since a predetermined or greater amount of impurities has been accumulated on the main stopper 200, the cylinder 600 may be automatically driven by the operation of the motor.

Figure 7:
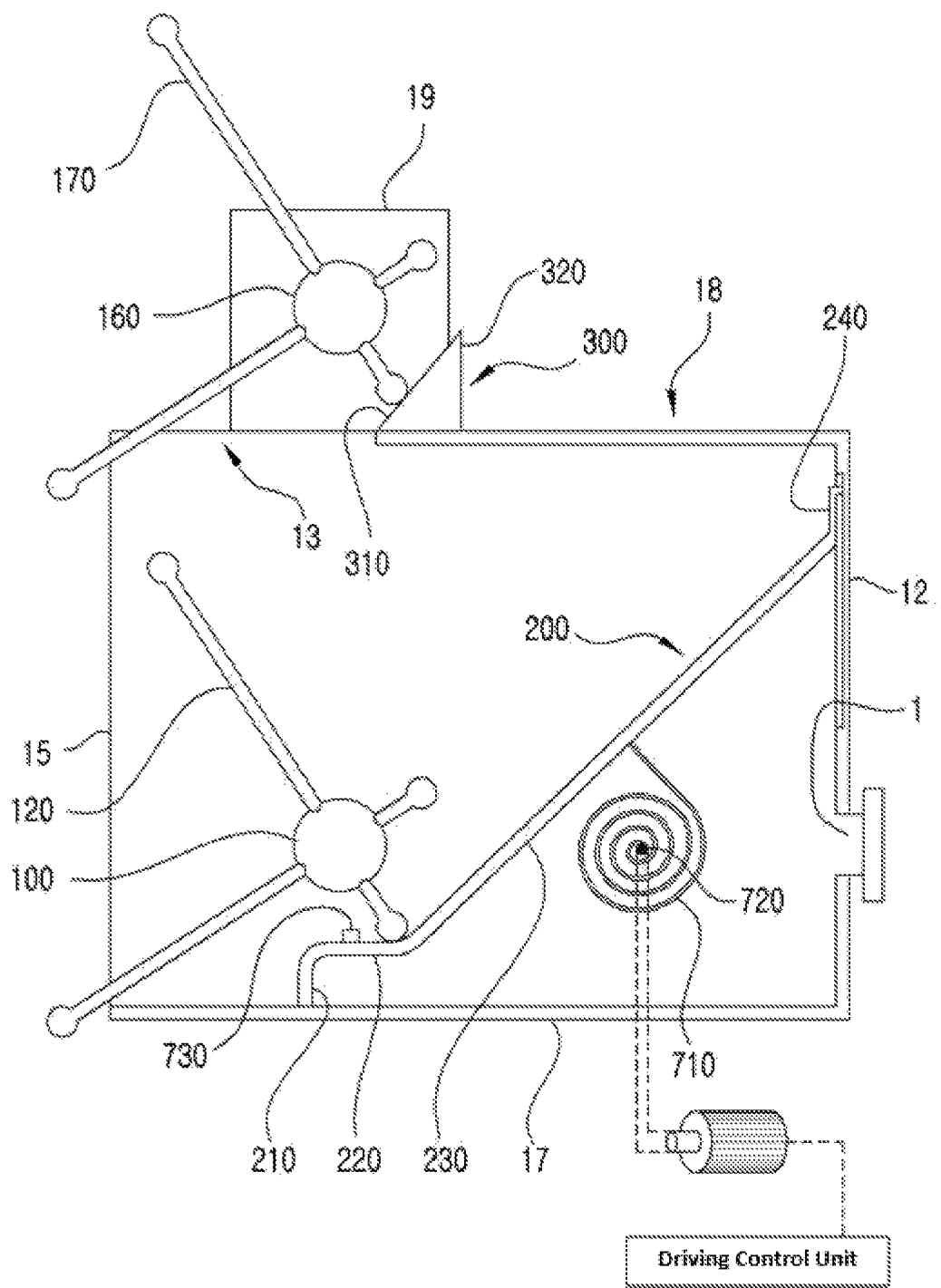
FIG. 7 is a side cross-sectional view illustrating a screen device according to another embodiment, in which the main stopper can be pivoted by means of a rolling drive unit.

FIG. 7 is a side cross-sectional view illustrating a screen device according to another embodiment, in which the main stopper can be pivoted by means of a rolling drive unit 700.

As illustrated in FIG. 7, a rolling drive unit 700 may include a torsion spring 710 with one end thereof adjoining the inner surface of the inclined portion 230; and a spring shaft 720 extending and exposed from one portion of the side portions 14 while being coupled to the torsion spring 710. The rolling drive unit 700 may further include a motor coupled to the spring shaft 720 to forwardly and reversely rotate the spring shaft 720.

In addition, the rolling drive unit 700 including the motor may further include a load sensor 730 and a driving control unit 740. The load sensor 730 may be mounted on an upper surface of the seating portion 220 to detect whether or not the motor operates.

The torsion spring 710 has one end adjoining the inner surface of the inclined portion 230 of the main stopper 200, and serves to adjust elastic compressive force, i.e. a wound-up state, due to a rolled state, thereby generating force for pushing or pulling the inclined portion 230.

The spring shaft 720 is coupled to the central portion of the torsion spring 710 and extends to be exposed from the side portions 14 of the housing 10.

According to this structure, when the user turns the spring shaft 720 in the clockwise or counterclockwise direction, elastic compression occurs on the torsion spring 710. It is possible to remove impurities accumulated or residing on the main stopper by pushing or pulling the inclined portion 230.

In addition, developed from the manual operation, when the motor mounted on the spring shaft 720 is driven, the torsion spring 710 can be automatically manipulated, which is convenient.

Furthermore, the present disclosure further provides a mechanism for controlling the operation of the motor. The driving control unit 740 controls whether or not to drive the motor depending on the level of the load detected by the load sensor 730, so that the torsion spring 710 can be automatically manipulated when impurities are residing on the seating portion 220. Accordingly, it is possible to save manpower.

Figure 8:
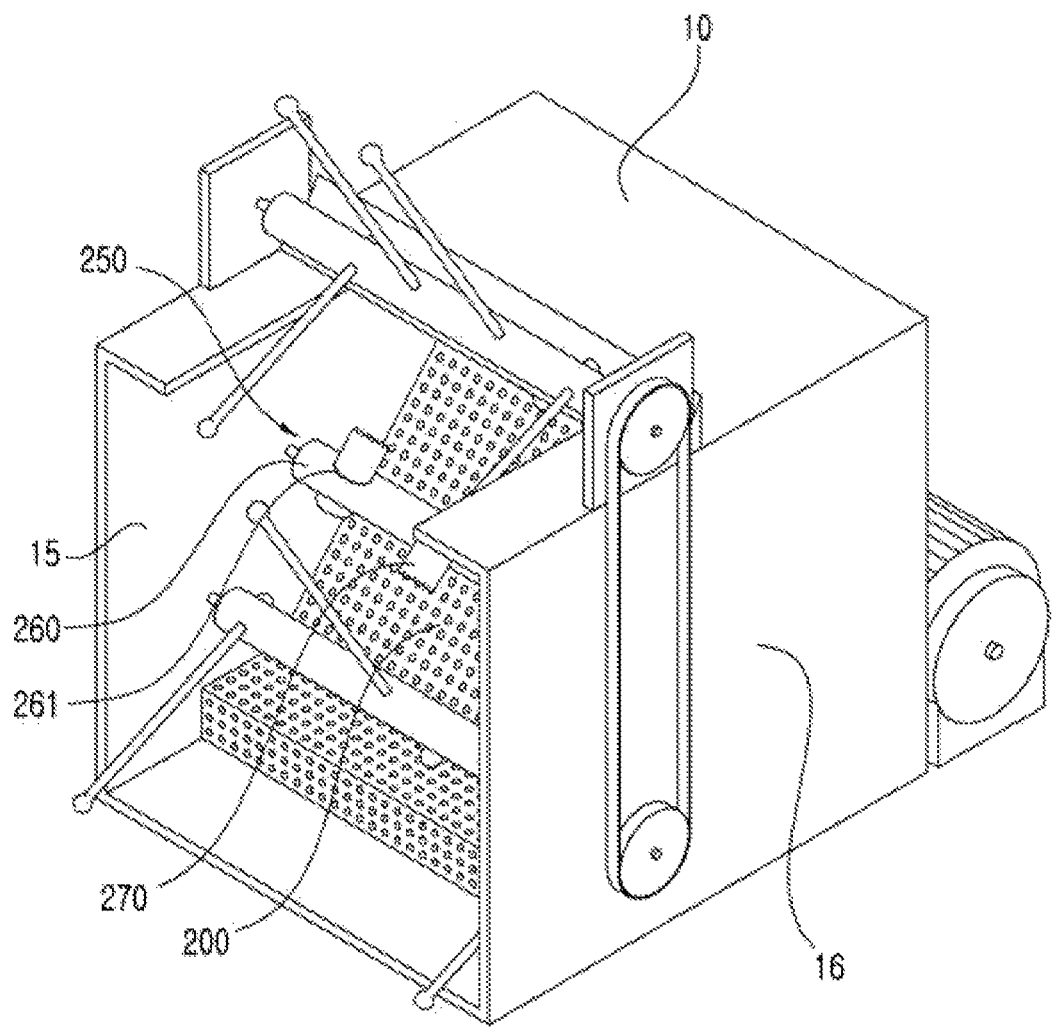
FIG. 8 is a perspective view illustrating a screen device according to another embodiment, in which a sub-impeller is disposed.

FIG. 8 is a perspective view illustrating a screen device according to another embodiment, in which a sub-impeller is disposed.

As described above, the main stopper 200 according to the disclosure is inclined and extends from an inner bottom of the housing 10 to the upper portion of the rear portion. In the embodiment illustrated in FIG. 8, the main stopper 200 extends toward the housing 10 such that the upper portion of the main stopper 200 does not reach the inner upper surface of the housing 10. Accordingly, an open space is defined between the upper portion of the main stopper 200 and the inner upper surface of the housing 10. In the embodiment illustrated in FIG. 8, the open space is referred to as an opening V (see FIG. 9).

The opening V provides a space through which impurities pushed or moved by the operation of a sub-impeller 250, to be described later, are discharged backwardly of the main stopper 200.

The sub-impeller 250 according to the disclosure is disposed inside of the housing 10, in front of the main stopper 200, and has a structure similar to that of the lower or upper impeller 100 or 150.

The sub-impeller 250 includes a sub-shaft 260 and sub-blades 270.

The sub-shaft 260 is a structure disposed in front of the main stopper 200, more particularly, above and in front of the main stopper 200 to extend from one side portion to the other side portion of the housing 10. The sub-shaft 260 is rotatably connected to the side portions of the housing 10. The sub-shaft 260 has a plurality of sub-holes 261 into which the sub-blades 270, to be described later, are fitted.

The sub-holes 261 are spaced apart from each other by predetermined distances in a longitudinal direction of the sub-shaft 260.

The sub-blades 270 are provided as a plurality of sub-blades 270, each of which is a structure extending through the corresponding sub-holes 261 in the sub-shaft 260, in opposite directions perpendicularly to the sub-shaft 260, and protruding predetermined distances from the sub-shaft 260. Here, the diameters of the sub-holes 261 may be designed to be greater than the diameters of the sub-blades 270, with gaps being defined between the sub-blades 270 and the sub-holes 261, such that the sub-blades 270 can slide in the direction of gravity.

In addition, the sub-blades 270 may be fabricated in a variety of shapes, such as a pipe, a circular rod, or a bar, without being limited to a specific shape, as long as a suitable amount of resistance to fluid entering the inlet portion 11 can be obtained.

According to this configuration, fluid entering the housing comes into contact with the sub-blades of the sub-impeller 250 while moving toward the main stopper 200. As the sub-blades 270 are pushed in the direction of a flow of fluid, the sub-shaft 260 is rotated in the direction of the flow of fluid.

In this process, the sub-blades 270 are moved in a top-bottom direction of the sub-holes 261 along the direction of the rotation and the direction of gravity. In particular, the sub-blades 270 come into contact with the main stopper 200 by passing by the lower surface of the housing 10 in a point at which the sub-blades 270 move from below to above the impeller 250.

Although the sub-blades 270 may enter the sub-holes 261 in the process in which the rotating sub-blades 270 come into contact with the main stopper 200, the sub-blades 270 can push accumulated impurities upwardly while remaining in contact with the main stopper 200 due to centrifugal force caused by the rotation of the sub-impeller 250, instead of being pushed toward the sub-holes 261. The impurities are discharged through the opening V defined between the upper end of the main stopper 200 and the inner upper surface of the housing 10.

Although not shown in the drawings, a container, such as a tank, in which impurities discharged through the opening V can be accommodated, may be provided behind the main stopper with respect to the opening V. Alternatively, a discharge pipe may be connected to the opening V, such that impurities can be moved outwardly through the discharge pipe, instead of unnecessarily interfering with the drain pump.

As described above, the screen device according to the disclosure is characterized by more conveniently and simply removing impurities accumulated on the front surface of the main stopper 200 by the process of retracting and withdrawing the operating sub-blades 270 due to the rotation of the sub-impeller 250. This operation can be performed using a flow of fluid without the use of a separate power source.

Figure 9:
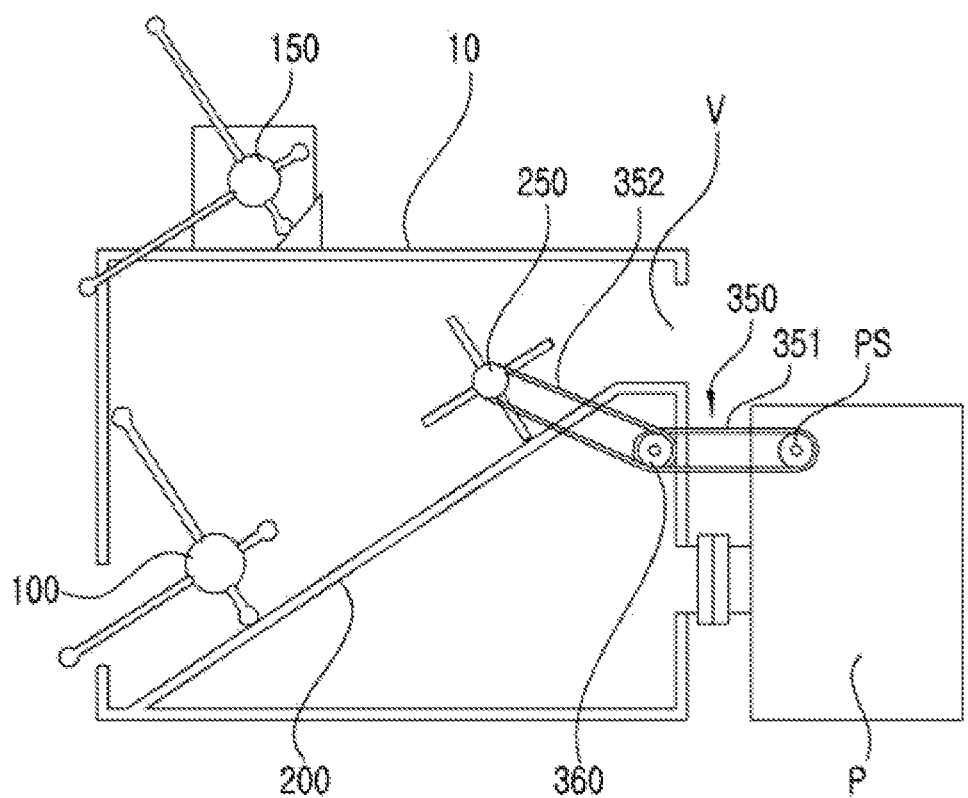
FIG. 9 is a side view illustrating a screen device according to another embodiment, in which the sub-impeller is rotated by power of the drain pump.

FIG. 9 is a side view illustrating a screen device according to another embodiment, in which the sub-impeller is rotated by power of the drain pump.

A known drain pump includes a drive motor and an impeller, and pumps fluid by rotating the impeller using the drive motor. In contrast, the drain pump according to the disclosure further includes a pump shaft PS connected to a rotary shaft of the impeller and extending outwardly. Here, as can be appreciated from FIG. 4, the pump shaft PS may be disposed at an angle and in a direction different from those of the rotary shaft of the impeller. In this regard, known power redirecting means, such as a link or a gear, may be added between the shaft of the drain pump and the pump shaft PS.

In a corresponding manner, the screen device according to the disclosure illustrated in FIG. 9 may include a conveyor belt 350 connecting the pump shaft PS and the sub-shaft 260. Accordingly, the operation of the drive motor disposed in the drain pump can rotate the pump shaft PS to drive the conveyor belt 350, thereby rotating the sub-shaft 260.

This structure is intended to provide reliable and powerful torque to the sub-impeller 250 by providing power to the sub-impeller 250. Accordingly, the sub-impeller 250 can reliably rotate to discharge impurities on main stopper 200 toward the opening V while being less influenced by the flow rate of fluid.

Here, although not shown in the drawings, a sprocket may be disposed on a joint between the pump shaft PS and the sub-shaft 260 to efficiently deliver power from the conveyor belt 350 to the sub-shaft 260. When the sprocket is disposed in this manner, the conveyor belt 350 may be implemented using a chain so as to be easily connected to the sprocket.

In addition, a pulley 360 may be disposed on a portion of the rear surface of the housing 10. The conveyor belt 350 may be comprised a first belt 351 and a second belt 352 connected via the pulley 360. The first belt 351 and the second belt 352 can be moved by the rotation of the pulley 360. This is intended to easily deliver power from the pump shaft PS to the sub-shaft 260 by adjusting the position of the pulley 360 connecting the pump shaft PS and the sub-shaft 260 when the pump shaft PS and the sub-shaft 260 are disposed in a variety of positions. Here, the pulley 360 may include two rotatable wheels connected to the first and second belts 351 and 352, respectively, such that the first and second belts 351 and 352 can operate independently without overlapping.

As described above, the screen device according to the disclosure as illustrated in FIG. 9 can more efficiently rotate the sub-impeller 260 by making full use of power of the drain pump, instead of using a separate power source. It is possible to provide reliable rotation of the sub-impeller 260 while reducing power consumption.

Figure 10A:
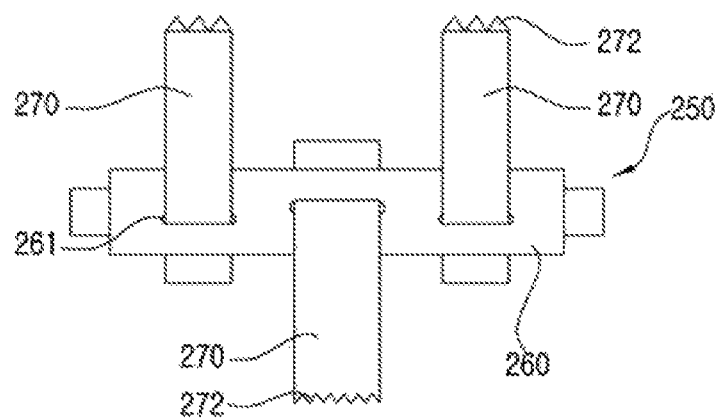
FIGS. 10A to 10C are conceptual views illustrating a variety of structures of the sub-blades illustrated in FIG. 8.
Figure 10B:
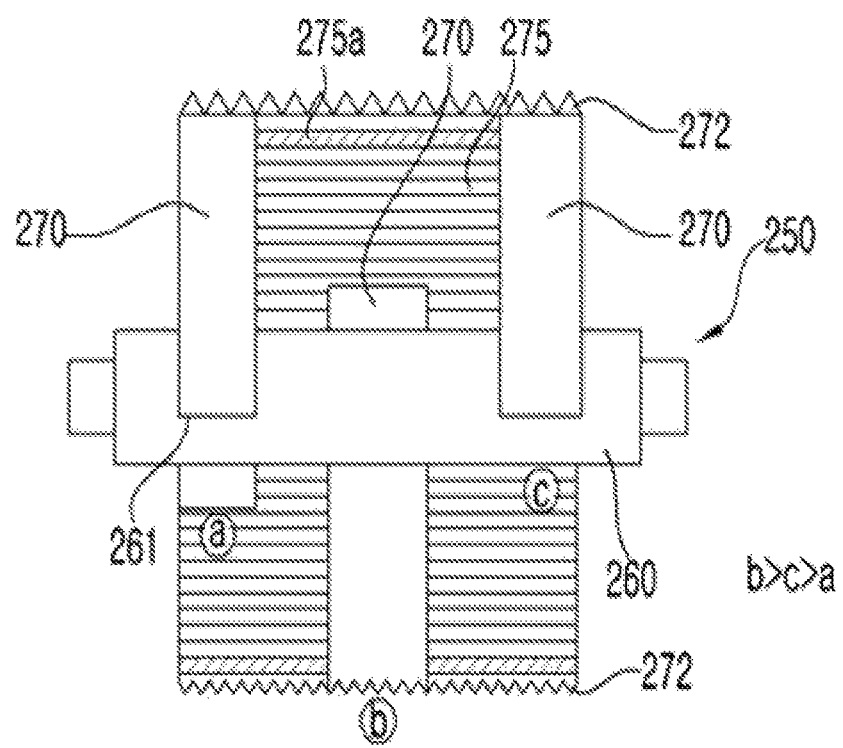
Figure 10C:
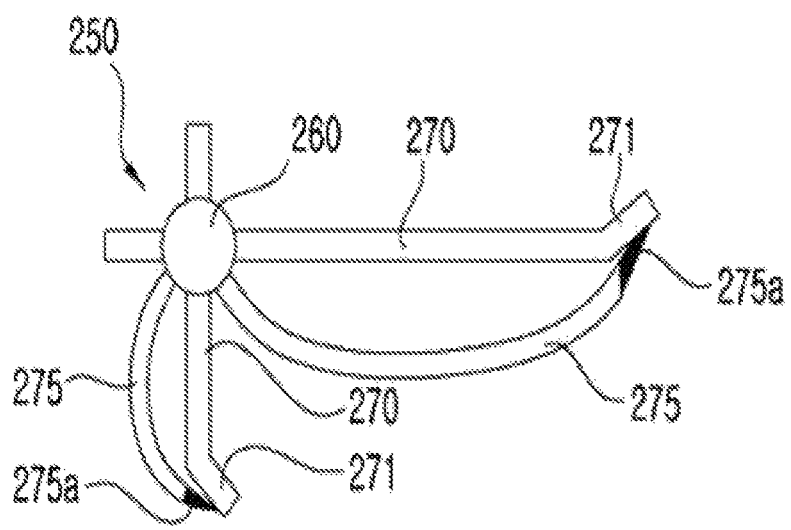

FIGS. 10A to 10C are conceptual views illustrating a variety of structures of the sub-blades illustrated in FIG. 8.

FIG. 10A illustrates an embodiment in which each width of the sub-blades 270 is greater than each width of the blades of the lower impeller 100 and the upper impeller 150 disposed in the front portion of the housing 10. Accordingly, a sufficient contact area between the sub-blades 270 and the main stopper 200 is provided, such that impurities accumulated on the main stopper 200 can be more easily moved toward the opening V.

FIG. 10B illustrates an embodiment in which the plurality of sub-blades 270 have different lengths. That is, when the sub-shaft 260 rotates, the sub-blades 270 may be obstructed by the pressure of fluid or impurities in fluid, thereby failing to properly come into contact with the main stopper 200. To prevent this problem, the sub-blades 270 are designed to improve the probability of the sub-blades 270 to properly come into contact with the main stopper 200.

FIG. 10C illustrates an embodiment in which bends 271 are provided on lower ends of the sub-blades 270 to be bent toward the main stopper 200.

The bends 271 have a function similar to that of a rake. Specifically, when the sub-blades 270 are in contact with the main stopper 200, the bends 271 can scrape impurities accumulated on the main stopper 200 so that the impurities can be easily moved upwardly.

In the sub-blades 270 described above with reference to FIGS. 10A to 10C, a plurality of sub-spikes 272 having predetermined pitches may protrude from one end of each of the sub-blades 270. The sub-spikes 272 may protrude in the direction of the main stopper 200 to scrape impurities stuck to the main stopper 200 so as to be detached from the main stopper 200. In this manner, the sub-spikes 272 can easily move the impurities toward the opening V. Although the sub-spikes 272 may be disposed on one end of each of the sub-blades 270 as illustrated in FIGS. 10A to 10C, the sub-spikes 272 are not limited thereto. The sub-spikes 272 may be disposed on both ends of each of the sub-blades 270.

In other words, the sub-spikes 272 having a predetermined weight are three-dimensional structures disposed on the bottom end of each of the sub-blades 270. In particular, the sub-spikes 272 may be formed of a non-metal material to prevent the main stopper 200 from being excessively stressed by the weight of the sub-spikes 272.

The sub-spikes 272 are tapered such that the thickness thereof gradually decreases in the direction of the distal end, so as to serve to scrape impurities accumulated on the front surface of the main stopper 200.

In addition, the sub-spikes 272 may be configured such that the length of protrusion thereof is adjustable.

Specifically, the sub-spikes 272 may be disposed on a distal end of a length adjustable device having a structure similar to the structure of a known vehicle telescopic antenna, or may be elastically retracted or withdrawn using a spring. With the length adjustable structure, the sub-spikes 272 serve to easily scrape impurities accumulated on the front surface of the main stopper 200, depending on the amount of impurities and the situation. The length adjustable structure is not limited to the above-described antenna structure or the spring structure but may be designed by applying a known cylinder structure or the like.

In addition, referring to FIGS. 10B and 10C, flexible corrugated films 275 are further provided. The flexible corrugated films 275 have a width corresponding to the length of the sub-shaft 260 or a width covering three adjacent sub-blades 270. One of the flexible corrugated films 275 extends from distal ends (i.e. a spike portion) of outer sub-blades 270 among the three sub-blades 270 to the sub-shaft 260, while the other flexible corrugated film 275 extends from the distal end of the middle sub-blade 270 among the three sub-blades 270 to the sub-shaft 260.

The sub-blades 270 may be four sub-blades 270. In this case, the four sub-blades 270 may be given sequence numbers, i.e. first, second, third, and fourth, from one side to the other side of the sub-shaft 260. The first and third sub-blades 270 may be fitted to sub-holes 261 among the plurality of sub-holes 261, extending in a first direction. The second and fourth sub-blades 270 may be fitted to sub-holes 261 among the plurality of sub-holes 261, extending in a second direction different from the first direction. One of the flexible corrugated films 275 may connect one end of the first sub-blade 270 and one end of the third sub-blade 270, while the other flexible corrugated film 275 may connect one end of the second sub-blade 270 and one end of the fourth sub-blade 270.

Each of the flexible corrugated films 275 is a structure comprised of a plurality of folds. Each of the flexible corrugated films 275 extends from the distal ends of at least two sub-blades 270, fitted to the sub-holes 261 formed in the sub-shaft 260 in the same direction, to the sub-shaft 260 while connecting the distal ends of the at least two sub-blades 270.

Each of the flexible corrugated films 275 has a bellows structure comprised of a plurality of folds, which are repeated in a direction parallel to the direction in which the sub-blades 270 are connected so as to obtain flexibility. The flexible corrugated films 275 may be stretched and contracted, i.e. unfolded and folded, in response to the movement of the sub-blades 270 without obstructing the movement of the sub-blades 270.

When the sub-blades 270 are rotated to upwardly scrape impurities accumulated on the main stopper 200 while being retracted into and withdrawing from the sub-holes 261, a portion of scraped impurities may escape between the sub-blades 270. The flexible corrugated films 275 provide a function of preventing this problem. That is, when the sub-blades 270 are in contact with the lower portion of the main stopper 200, the sub-blades 270 are fully spread, i.e. in the unfolded state, due to gravity. When the sub-blades 270 rotate and move upwardly to enter the sub-holes 261, the sub-blades 270 are folded toward the distal ends thereof. In this process, the sub-blades 270 serve as a safety tray for moving impurities, scraped from the main stopper 200, toward the opening V while preventing impurities from slipping away.

A portion of the flexible corrugated film 275, connected to the distal ends of the sub-blades 270, may be formed to thicker than the other portions of the flexible corrugated film 275 or provided with a frame 275a formed of a material able to providing a level of strength in order to prevent the flexible corrugated film 275 from being easily torn and guarantee the ease of stretching and contraction. That is, the at least two sub-blades 270 connected by the flexible corrugated film 275 are fitted into the sub-holes 261 of the sub-shaft 260 formed in the same direction, and thus, move in the same direction. Accordingly, the frame 275a may be folded or unfolded along with the movement of the two sub-blades 270 instead of being offset or bent toward one of the two sub-blades 270.

Here, the frame 275a may include a plurality of sub-spikes 272 protruding in the longitudinal direction of the frame 265a. The sub-spikes 272 may be spaced apart from each other at predetermined distances in the lateral direction of the frame 275a. Accordingly, when sub-blades 270 move while in contact with the main stopper 200, the frame 275a can more efficiently scrape and move impurities on the main stopper 200.

Here, in FIGS. 10A and 10B, the sub-holes 261, to which the outer sub-blades 270 and the middle sub-blade 270 are fitted, are illustrated as being formed in the same direction. In addition, in FIG. 10C, the sub-holes 261, to which the outer sub-blades 270 are fitted, and the sub-holes 261, to which the middle sub-blade 270 are fitted, are illustrated as being formed in perpendicular directions. In this manner, the sub-holes 261 may be arranged in a variety of patterns.

As described above, the plurality of embodiments illustrated in FIG. 2 can provide environments in which the sub-blades 270 can more efficiently and easily remove impurities accumulated on the main stopper 200.

Figure 11:
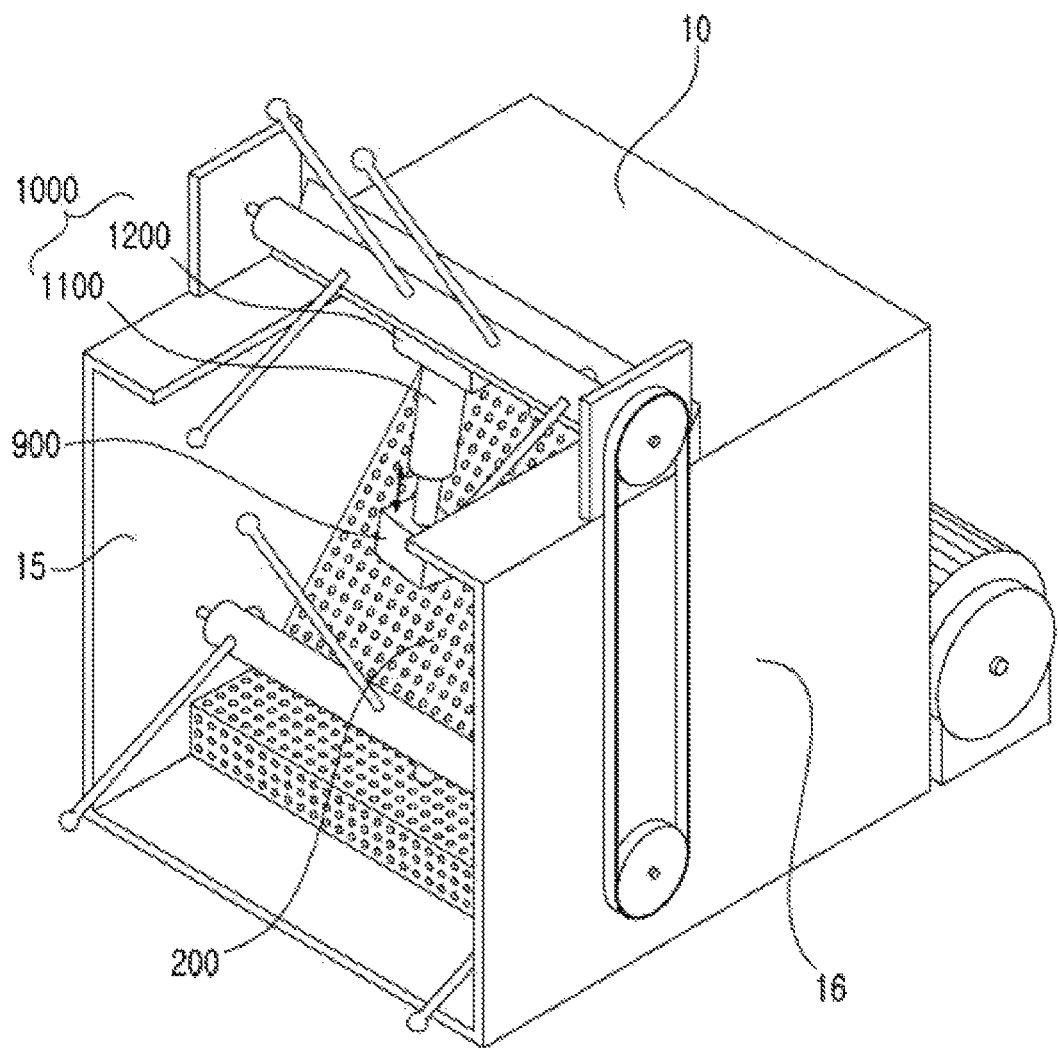
FIG. 11 is a perspective view illustrating a non-powered drain pump screen device according to another embodiment, in which a working device is disposed.

FIG. 11 is a perspective view illustrating a non-powered drain pump screen device according to another embodiment, in which a working device is disposed.

The non-powered drain pump screen device illustrated in FIG. 11 is characterized by including a working device 900 and a drive unit 1000.

The working device 900 is provided in front of the main stopper 200 to be connected to the drive unit 1000, to be described later, such that the working device 900 can remove impurities accumulated on the front surface of the main stopper 200. The working device 900 is not limited to a specific shape and may have a variety of shapes, as long as impurities accumulated on the front surface of the main stopper 200 can be removed.

For example, the working device 900 may have the shape of a hook to remove impurities from the main stopper 200 by piercing impurities accumulated on the main stopper 200. In addition, the working device 900 may have the shape of pincers to remove impurities from the main stopper 200 by grasping impurities accumulated on the main stopper 200. The working device 900 may be provided in the shape of a block to provide a physical volume to push impurities from the main stopper 200 on which the impurities are accumulated. That is, the working device 900 according to the disclosure may be provided in a variety of shapes and structures able to remove accumulated impurities, instead of being limited to a specific shape.

The drive unit 1000 is a driving force controlling means for driving the working device 900. In other words, the drive unit 1000 can move the working device 900 in a top-bottom direction or a lateral direction using a variety of structures to be described later, so that impurities accumulated on the front surface of the main stopper 200 are discharged.

For example, the drive unit 1000 may include a hydraulic cylinder 1100, a sub-hydraulic cylinder 1300, a wiper 1500 (see FIG. 13), fixed guide rail 1700s (see FIG. 14), a movable guide rail 1810 (see FIG. 14) to drive and control the working device 900 in a variety of directions. Structural stability may also be complemented by addition of a variety of sub-components. Here, the sub-components may include a variety of mechanical structures, such as a pulley, a belt, and a power transmitting means.

As described above, the drive unit 1000 provides a function of moving and controlling the working device 900 so that impurities accumulated on the front surface of the main stopper 200 can be easily removed using the working device 900.

More specifically, the drive unit 1000 may include a hydraulic cylinder 1100 and a cylinder driving unit 1200.

First, the hydraulic cylinder 1100 has a structure extending from the upper portion of the housing 10 to the working device 900. In other words, the working device 900 is mounted on the distal end of the hydraulic cylinder 1100.

The hydraulic cylinder 1100 may be disposed in front of the main stopper 200 and parallel to a direction in which the main stopper 200 extends. Here, the hydraulic cylinder 1100 may be configured such that the distal end of the hydraulic cylinder 1100 may be inclined to face the main stopper 200, so that the distal end of the hydraulic cylinder 1100 can come into contact with the main stopper 200 when the hydraulic cylinder 1100 is stretched. Accordingly, the hydraulic cylinder 1100 can easily detach impurities from the main stopper 200 by beating the bottom end of the main stopper 200, with which impurities are in tight contact, or cause impurities to be easily wiped toward the lower front portion of the main stopper 200 in the inclined direction of the main stopper 200.

As described above, the stretching and contraction of the hydraulic cylinder 1100 drives the working device 900 to move in a top-bottom direction, so that the working device 900 outwardly pushes impurities accumulated on the front surface of the main stopper 200. According to this operation, the hydraulic cylinder 1100 is specialized to push impurities accumulated on an area of the main stopper 200 extending from the lower portion to the central portion, in a downward direction from the main stopper 200.

The cylinder driving unit 1200 is disposed on one portion of the upper portion of the hydraulic cylinder 1100 (i.e. a portion in which the housing 10 and the hydraulic cylinder 1100 are connected). The cylinder driving unit 1200 provides a function of controlling adjustment in the length of the hydraulic cylinder 1100, i.e. a function of stretching and contracting the hydraulic cylinder 1100. Descriptions of the cylinder driving unit 1200 will be omitted, since the cylinder driving unit 1200 is similar to a known means for driving the hydraulic cylinder 1100.

As described above, the drive unit 1000 including the hydraulic cylinder 1100 and the cylinder driving unit 1200 according to the disclosure serves to downwardly push impurities accumulated on the front surface of the main stopper 200 using the stretching and contraction of the hydraulic cylinder 1100 in the top-bottom direction.

Figure 12:
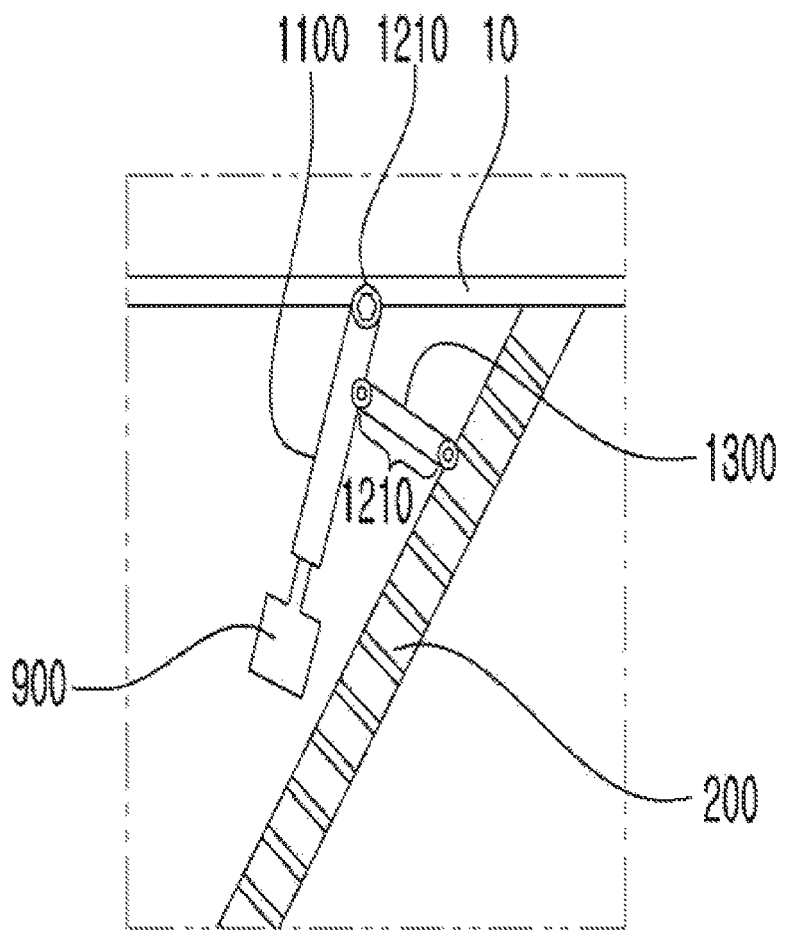
FIG. 12 is a side view illustrating a modified embodiment of the embodiment illustrated in FIG. 11.

FIG. 12 is a side view illustrating a modified embodiment of the embodiment illustrated in FIG. 11.

Prior to describing the modified embodiment illustrated in FIG. 12, the hydraulic cylinder 1100 illustrated in FIG. 12 will be described. The hydraulic cylinder 1100 illustrated in FIG. 12 has a structure able to pivot via a hinge 1210 mounted on the upper portion of the housing 10, differently from the hydraulic cylinder 1100 illustrated in FIG. 11.

That is, the modified embodiment illustrated in FIG. 12 is proposed as a structure further including a sub-hydraulic cylinder 1300 and a sub-cylinder driving unit 1400, in addition to the hydraulic cylinder 1100 having the above-described structure.

The sub-hydraulic cylinder 1300 is a sub-member connecting the upper portion of the hydraulic cylinder 1100 and the front surface of the main stopper 200. The sub-hydraulic cylinder 1300 stretches and contracts while being pivoting, due to hinges 1210 mounted on both ends of the sub-hydraulic cylinder 1300.

Accordingly, the sub-hydraulic cylinder 1300 controls the pivoting of the hydraulic cylinder 1100, more particularly, stretches and contracts to move the hydraulic cylinder 1100 so that impurities accumulated on the front surface of the main stopper 200 are moved not only in a downward direction but also in an upward direction.

In other words, the sub-hydraulic cylinder 1300 serves to combine linear movement and pivoting to easily remove accumulated impurities in order to overcome the problem in that accumulated impurities are not removed by the simple linear movement of the hydraulic cylinder 1100.

Accordingly, the sub-hydraulic cylinder 1300 can change the inclined angle between the hydraulic cylinder 1100 and the main stopper 200 to beat various portions of accumulated impurities, thereby outwardly pushing accumulated impurities from the main stopper 200.

In addition, the sub-cylinder driving unit 1400 is mounted on the upper portion of the main stopper 200 (i.e. a portion in which the main stopper 200 and the sub-hydraulic cylinder 1300 are connected). Like the function of the cylinder driving unit 1200 acting on the hydraulic cylinder 1100, the sub-cylinder driving unit 1400 provides the function of controlling the adjustment in the length of the sub-hydraulic cylinder 1300, i.e. the function of stretching and contracting the sub-hydraulic cylinder 1300. Further detailed descriptions of the sub-cylinder driving unit 1400 will be omitted, since the sub-cylinder driving unit 1400 is substantially the same as a known means for driving the sub-hydraulic cylinder 1300.

As described above, the drive unit 1000 including the sub-hydraulic cylinder 1300 and the sub-cylinder driving unit 1400 can combine the linear movement and the pivoting to easily remove accumulated impurities in order to overcome the problem in that accumulated impurities are not removed by the simple linear movement of the hydraulic cylinder 1100.

Figure 13:
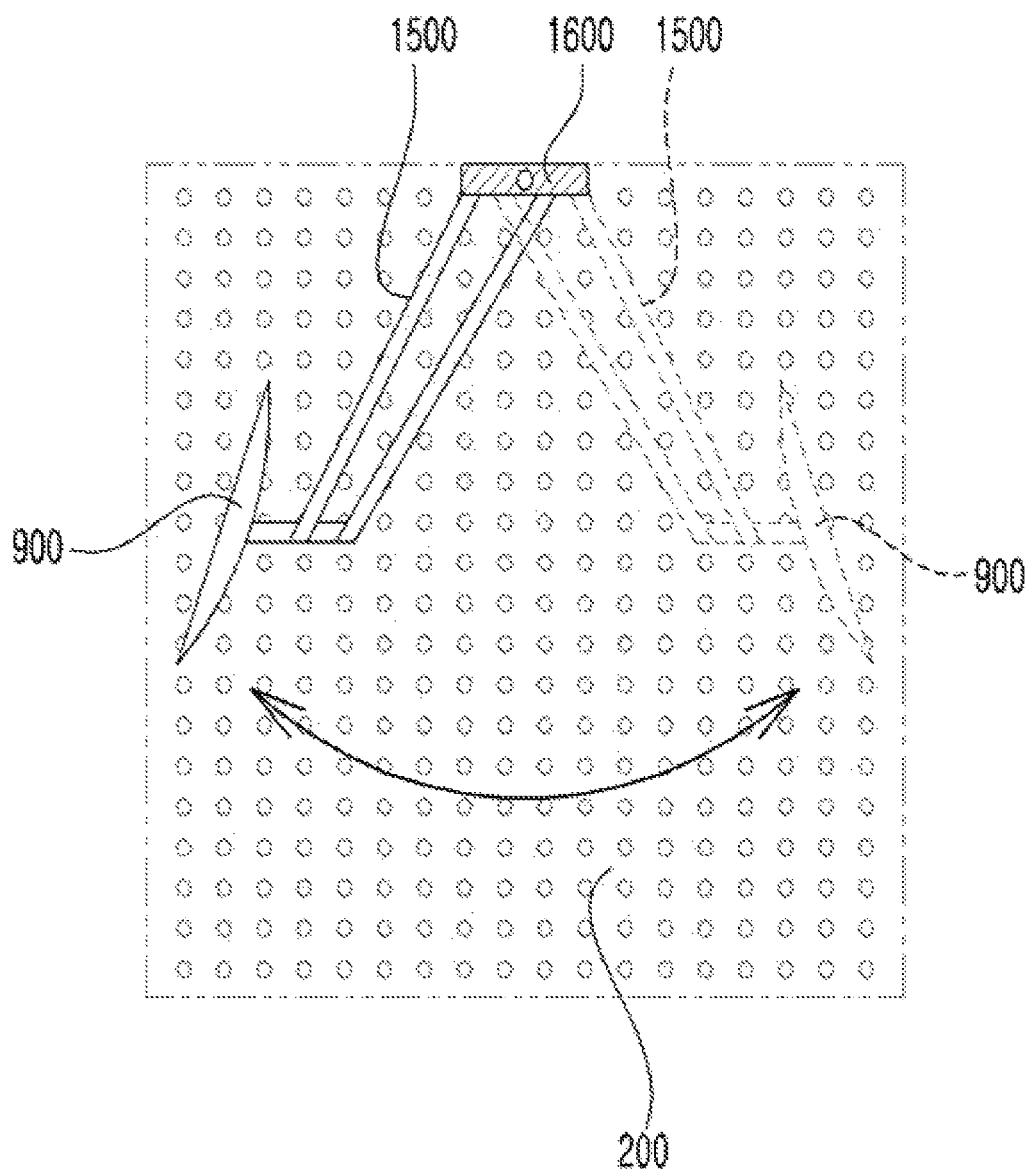
FIG. 13 is a partially enlarged perspective view illustrating a non-powered drain pump screen device according to a second embodiment of the disclosure.

FIG. 13 is a partially enlarged perspective view illustrating a non-powered drain pump screen device according to a second embodiment of the disclosure.

The embodiment illustrated in FIG. 13 proposes a structure in which the driving unit includes a wiper and a wiper driving unit.

In the embodiment illustrated in FIG. 13, a wiper 1500 pivotably extends from a central portion of the upper portion or the lower portion of the housing 10 to the working device 900. The wiper 1500 operates in a manner similar to a vehicle wiper. In other words, the working device 900 is attached to the distal end of the wiper 1500. Here, the wiper 1500 pivots the working device 900 in a lateral direction of the main stopper 200 to push impurities accumulated on the front surface of the main stopper 200 toward both peripheral portions of the main stopper 200 adjoining the left portion 15 and the right portion 16 of the housing 10, i.e. toward the left and right peripheral portions of the main stopper 200.

A wiper driving unit 1600 is disposed on the central portion of the upper portion or the lower portion of the housing 10. The wiper driving unit 1600 serves to control the pivoting of the wiper 1500 in order to adjust a width in which the working device 900 pivots in a lateral direction. When the wiper 1500 is mounted on the central portion of the lower portion of the housing 10, the wiper 1500 causes the working device 900 to pivot in the lateral direction of the main stopper 200 so as to rapidly push accumulated impurities from the front surface of the main stopper 200. In addition, when the wiper 1500 is mounted on the central portion of the upper portion of the housing 10, the wiper 1500 is subjected to less resistance of sewage or supply water, thereby reducing fatigue. Although detailed descriptions of the wiper driving unit 1600 may be omitted, since the wiper driving unit 1600 is the same as a known means for driving the wiper 1500, the wiper driving unit 1600 may include, for example, a pivoting portion, a pivot shaft, and a driving means.

The driving means serves to provide power to pivot the pivot shaft. The driving means may be implemented as a known power supply means, such as a motor, or may be implemented as the above-described power transmitting means.

The pivot shaft is pivoted by power supplied by the driving means, and the pivoting portion is mounted on the outer end of the pivot shaft.

The pivoting portion connects the pivot shaft to one end of the wiper 1500. In other words, the pivoting portion serves as a medium to deliver torque from the driving means to the wiper 1500.

As described above, the drive unit 1000 including the wiper 1500 and the wiper driving unit 1600 is characterized by pushing impurities accumulated on the main stopper 200 in the lateral direction by pivot movement.

Figure 14:
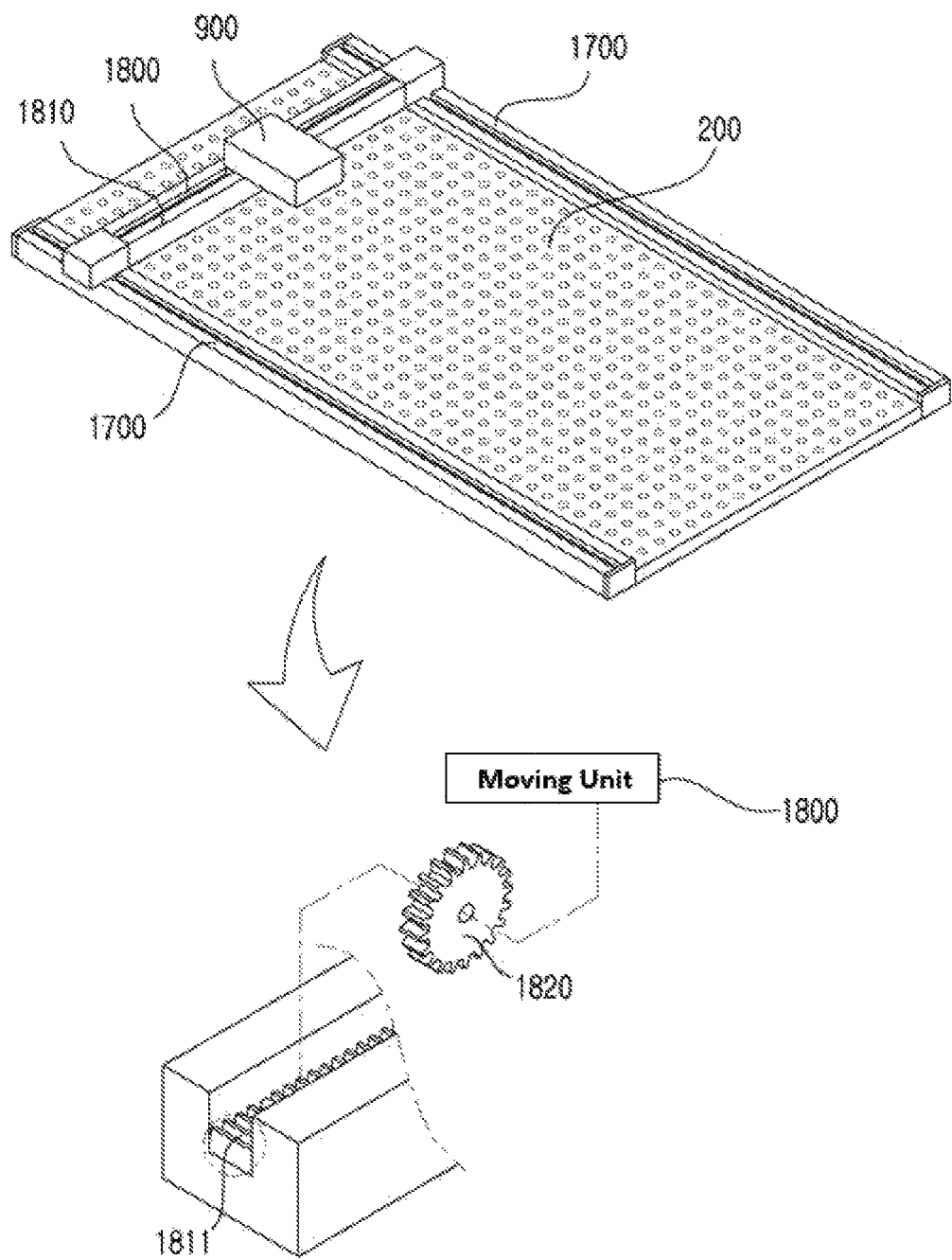
FIG. 14 is a partially enlarged perspective view illustrating an application in which the working device according to the disclosure, illustrated in FIG. 11, is driven on guide rails.

FIG. 14 is a partially enlarged perspective view illustrating an application in which the working device according to the disclosure, illustrated in FIG. 11, is driven on guide rails.

The non-powered drain pump screen device according to the disclosure, illustrated in FIG. 11, proposes a structure including fixed guide rails 1700, a moving unit 1800, and the working device 900.

In the embodiment illustrated in FIG. 11, the fixed guide rails 1700 may extend along both peripheral portions of the housing 10 in the inclined direction of the main stopper 200.

That is, the fixed guide rails 1700 are a pair of rails extending in the inclined direction of the main stopper 200. Here, when the main stopper 200 has the linearly inclined structure, it may be general that the fixed guide rails 1700 are attached to the main stopper 200. If the main stopper 200 has the three-dimensional inclined structure illustrated in FIG. 6, the movement of the moving unit 1800 to be described later is limited. In this case, the fixed guide rails 1700 may be attached to the left and right side portions of the housing 10, adjacent to the main stopper 200.

The fixed guide rails 1700 allow the working device 900 to be pushed in the top-bottom direction of the main stopper 200. The moving unit 1800 serves as a means for moving the working device 900 in the direction of extension of the fixed guide rails 1700.

The moving unit 1800 extends in a direction (i.e. the lateral direction of the main stopper 200) perpendicular to the direction of extension of the fixed guide rails 1700 to be movable in the direction of extension of the fixed guide rails 1700. The moving unit 1800 provides a physical space in which the working device 900 can be disposed. Here, the moving unit 1800 is provided as a single moving unit 1800 corresponding to the number of the working device 900, and has the shape of a bar.

The moving unit 1800 may include a movement controlling means for controlling the movement of moving unit 1800 in the direction of extension of the fixed guide rails 1700. The movement controlling means is disposed in the moving unit 1800, and provides driving force to the moving unit 1800 to move along the fixed guide rails 1700. The movement controlling means includes a wheel 1820 and a motor (not shown), and is connected to the moving unit 1800. Here, the wheel 1820 has the structure of a pinion, and the motor provides driving force to rotate the wheel 1820.

In a corresponding manner, the moving unit 1800 is provided as a rail including a rack 1811. The rack 1811 and the wheel 1820 are combined into a rack-pinion structure, which enables movement along the fixed guide rails 1700. Here, the rack 1811 is intended to prevent the moving unit 1800 from slipping.

Accordingly, the moving unit 1800 can efficiently and precisely move along the fixed guide rails 1700. Further descriptions of this structure will be omitted, since this structure is similar to a known rack-pinion structure.

Furthermore, the moving unit 1800 may include the movable guide rail 1810 having the structure of a rail.

Here, the movable guide rail 1810 serves to move the working device 900 along the moving unit 1800, so that impurities accumulated on the front surface of the main stopper 200 can be pushed toward a peripheral portion of the main stopper 200, in the direction of one end of each of the fixed guide rails 1700.

The movable guide rail 1810 may include the rack 1811, which constitutes the rack-pinion structure together with the wheel 1820, such that the working device 900 can precisely move along the moving unit 1800. Here, the wheel 1820 is disposed on the working device 900 while being coupled to the upper portion of the rack 1811. It is required that the wheel 1820 can be rotated by the motor.

In addition, although the movable guide rail 1810 has been illustrated as having the rack-pinion structure to achieve precise movement, the movable guide rail 1810 is not limited thereto. The movable guide rail 1810 may have a variety of other known mechanical combinations for moving the working device 900 along the moving unit 1800.

As described above, the fixed and movable guide rails 1700 and 1810 can move the working device 900 in the top-bottom direction and the lateral direction of the main stopper 200. Accordingly, it is possible to remove impurities accumulated on the front surface of the main stopper 200 by pushing the accumulated impurities in the top-bottom direction and the lateral direction.

The configurations and functions of the investment management system using big data analysis according to the present disclosure have been described with reference to the drawings. It should be understood, however, that the foregoing descriptions are illustrative only, and the technical idea of the present disclosure is not limited to the foregoing descriptions or the accompanying drawings. Those having ordinary knowledge in the art will appreciate that various modifications and changes in forms are possible without departing from technical idea of the present disclosure.

What is claimed is:

1. A non-powered drain pump screen device comprising:
    a drain pump;
    a housing disposed on a front end of the drain pump, and having an inner space, wherein the housing includes an inlet portion defined by an open front portion of the housing, a rear portion located opposite the inlet portion and having an outlet portion connected to the drain pump, left and right side portions, an upper open area adjacent to the inlet portion, a top plate closing an upper portion of the housing, except for the upper open area;
    a lower impeller disposed within the space, wherein the lower impeller includes a lower shaft rotatably coupled to the side portions while extending through lower portions of the side portions, a plurality of coupling holes provided in the lower shaft, and lower blades extending a predetermined length to be movably coupled to the coupling holes;
    an upper impeller extending across both peripheral portions of the top plate and disposed on the top plate, wherein the upper impeller includes an upper shaft having the same configuration as the lower shaft of the lower impeller, a plurality of coupling holes provided in the upper shaft, and upper blades extending a predetermined length to be movably coupled to the coupling holes;
    a chain connecting the lower impeller and the upper impeller;
    an main stopper having a shape of an inclined plate extending from a bottom of the housing to the rear portion of the housing along an inclined line, with a plurality holes being provided in the main stopper, wherein portions of the lower blades dropping due to gravity collide with the main stopper, thereby being prevented from being dislodged from the lower shaft; and
    an inclined sub-stopper extending from one peripheral portion of the top plate, wherein portions of the upper blades dropping due to gravity collide with the sub-stopper so as not to be dislodged from the upper shaft.

2. The non-powered drain pump screen device according to claim 1, wherein the main stopper includes:
    a lower erect portion erect from the bottom of the housing to a predetermined height;
    a seating portion horizontally extending from one end of the lower erect portion to the rear portion of the housing to be located below the lower impeller;
    an inclined portion extending upwardly from the seating portion to the rear portion of the housing; and
    an upper erect portion bent upwardly from the inclined portion and coupled to the rear portion of the housing.

3. The non-powered drain pump screen device according to claim 1, wherein the sub-stopper includes:
    a sub-inclined portion extending upward from a portion of the top plate, positioned below the upper shaft, toward the rear portion of the housing; and
    a sub-erect portion extending from one end of the sub-inclined portion to the other peripheral portion of the top plate in a normal direction.

4. The non-powered drain pump screen device according to claim 1, further comprising a container disposed outside of the housing to accommodate impurities discharged through the upper open area by rotation of the upper impeller and the lower impeller.

5. The non-powered drain pump screen device according to claim 2, wherein the housing further includes rails extending along both peripheral portions of the rear portion, adjacent to the upper erect portion of the main stopper, in a top-bottom direction, and
    the upper erect portion is slidable in a direction of extension of the rails by pressure of water entering through the front portion of the housing in a position in which upper erect portion is coupled to the rails,
    such that the main stopper elastically pivots.

6. The non-powered drain pump screen device according to claim 2, further comprising a hydraulic cylinder extending from the bottom of the housing to contact an inner surface of the inclined portion of the main stopper, the hydraulic cylinder being stretchable and contractible to elastically pivot the main stopper.

7. The non-powered drain pump screen device according to claim 2, further comprising a rolling drive unit including:
    a torsion spring having one end adjoining an inner surface of the inclined portion of the main stopper; and
    a spring shaft extending and exposed from one portion of the side portions of the housing while being coupled to the torsion spring, the spring shaft allowing the torsion spring to be wound or unwound.

8. The non-powered drain pump screen device according to claim 7, wherein the rolling drive unit further includes a motor coupled to the spring shaft to forwardly and reversely rotating the torsion spring.

9. The non-powered drain pump screen device according to claim 8, further comprising a load sensor disposed on an upper surface of the seating portion of the main stopper,
    wherein the rolling drive unit further includes a driving control unit controlling whether or not to operate the motor depending on a level of the load detected by the load sensor.

10. The non-powered drain pump screen device according to claim 1, wherein the main stopper extends toward an inner upper surface of the housing so as not to reach the inner upper surface, thereby defining an opening between the main stopper and the inner upper surface of the housing, and
    the non-powered drain pump screen device further comprising a sub-impeller disposed in front of the main stopper, wherein the sub-impeller includes a sub-shaft extending from one side portion to the other side portion of the housing and rotatably connected to the side portions of the housing, a plurality of sub-holes provided in the sub-shaft at predetermined distances from each other, and a plurality of sub-blades extending predetermined lengths and movably fitted into the sub-holes.

11. The non-powered drain pump screen device according to claim 10, wherein the drain pump includes a pump shaft rotated by a drive motor,
the non-powered drain pump screen device further comprising a conveyor belt connecting the pump shaft and the sub-shaft, such that the sub-impeller is rotated by operation of the drive motor.

12. The non-powered drain pump screen device according to claim 10, wherein the sub-blades have a plurality of sub-spikes having predetermined pitches and protruding toward the main stopper.

13. The non-powered drain pump screen device according to claim 10, wherein the sub-impeller further includes a flexible corrugated film having a plurality of folds, wherein the flexible corrugated film extends to the sub-shaft while covering an area between at least two sub-blades among the plurality of sub-blades, fitted to sub-holes among the plurality of sub-holes, formed in the sub-shaft in the same direction.

14. The non-powered drain pump screen device according to claim 13, wherein the flexible corrugated film includes:
a frame extending to connect the distal ends of the sub-blades; and
a plurality of sub-spikes protruding in a longitudinal direction of the frame and being spaced apart from each other at predetermined distances in a lateral direction of the frame.

15. The non-powered drain pump screen device according to claim 1, further comprising:
a working device located in front of the main stopper; and
a drive unit controlling movement of the working device to remove impurities accumulated on a front surface of the main stopper.

16. The non-powered drain pump screen device according to claim 15, wherein the drive unit includes:
a hydraulic cylinder extending from the upper portion of the housing to the working device; and
a cylinder driving unit controlling adjustment in a length of the hydraulic cylinder.

17. The non-powered drain pump screen device according to claim 16, wherein the hydraulic cylinder is pivotably disposed on the upper portion of the housing, and
the drive unit include:
a sub-hydraulic cylinder pivotably extending to the hydraulic cylinder and the main stopper; and
a sub-cylinder driving unit controlling adjustment in a length of the sub-hydraulic cylinder.

18. The non-powered drain pump screen device according to claim 15, wherein the drive unit includes:
a wiper pivotably extending from a central portion of the upper portion or a lower portion of the housing to the working device; and
a wiper driving unit controlling pivoting of the wiper.

19. The non-powered drain pump screen device according to claim 15, wherein the drive unit includes:
fixed guide rails extend along both peripheral portions of the housing in an inclined direction of the main stopper; and
a moving unit movable along the fixed guide rails, and wherein the working device is disposed on the moving unit.

20. The non-powered drain pump screen device according to claim 19, wherein the moving unit includes a movable guide rail movable along the fixed guide rails, and
the working device is movable in a direction of extension of the movable guide rail.

* * * * *